(12) United States Patent
Guo et al.

(10) Patent No.: US 11,140,666 B2
(45) Date of Patent: Oct. 5, 2021

(54) UPLINK CONTROL INFORMATION TRANSMISSION METHOD AND APPARATUS

(71) Applicant: Huawei Technologies Co., Ltd., Shenzhen (CN)

(72) Inventors: Jingrui Guo, Shanghai (CN); Yubo Yang, Shanghai (CN); Peng Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/926,105

(22) Filed: Jul. 10, 2020

(65) Prior Publication Data
US 2020/0351867 A1 Nov. 5, 2020

Related U.S. Application Data

(63) Continuation of application No. PCT/CN2018/124794, filed on Dec. 28, 2018.

(30) Foreign Application Priority Data

Jan. 12, 2018 (CN) .......................... 201810032725.7

(51) Int. Cl.
*H04L 1/18* (2006.01)
*H04L 5/00* (2006.01)
(Continued)

(52) U.S. Cl.
CPC ....... *H04W 72/0413* (2013.01); *H04L 1/1819* (2013.01); *H04L 5/0051* (2013.01);
(Continued)

(58) Field of Classification Search
CPC ............. H04W 72/0413; H04W 76/27; H04W 72/042; H04W 72/0446; H04L 1/1819; H04L 5/0051
See application file for complete search history.

(56) References Cited

U.S. PATENT DOCUMENTS 10,492,213 B2    11/2019    Ryu et al.
2011/0141928 A1*   6/2011    Shin ...................... H04L 5/0053
                                                 370/252
(Continued)

FOREIGN PATENT DOCUMENTS

CN          105409153 A     3/2016
CN          107276715 A    10/2017
(Continued)

OTHER PUBLICATIONS

ZTE, Sanechips, UCI multiplexing on PUSCH. 3GPP TSG RAN WG1 Meeting NR#3 Nagoya, Japan, Sep. 18-21, 2017, R1-1715526, 5 pages.
(Continued)

*Primary Examiner* — Huy D Vu
*Assistant Examiner* — Bailor C. Hsu
(74) *Attorney, Agent, or Firm* — Slater Matsil, LLP

(57) ABSTRACT

This application discloses an uplink control information transmission method. A terminal may determine, based on received first DCI, whether UCI triggered by the DCI is highly reliable UCI, and if the UCI is highly reliable UCI, design a special transmission policy for the UCI, to protect the UCI and ensure reliability of a URLLC service. In this application, the special transmission policy may be superior to a common UCI transmission policy in at least one of the following aspects: a transmission resource, a coding scheme, a sending sequence, and the like.

13 Claims, 17 Drawing Sheets

(51) Int. Cl.
*H04W 72/04* (2009.01)
*H04W 76/27* (2018.01)

(52) U.S. Cl.
CPC ..... *H04W 72/042* (2013.01); *H04W 72/0446* (2013.01); *H04W 76/27* (2018.02)

(56) References Cited

U.S. PATENT DOCUMENTS

| | | | |
|---|---|---|---|
| 2011/0299484 A1* | 12/2011 | Nam | H04L 5/0057 370/329 |
| 2012/0113827 A1* | 5/2012 | Yamada | H04W 36/06 370/252 |
| 2015/0215944 A1* | 7/2015 | Kim | H04L 5/001 370/329 |
| 2017/0273027 A1* | 9/2017 | Kim | H04W 52/48 |
| 2018/0167931 A1* | 6/2018 | Papasakellariou | H04L 5/0053 |
| 2018/0167933 A1* | 6/2018 | Yin | H04L 5/0055 |
| 2018/0219649 A1* | 8/2018 | Ying | H04L 1/1819 |
| 2018/0359057 A1* | 12/2018 | Yang | H04L 5/00 |
| 2019/0090258 A1* | 3/2019 | Ryu | H04B 7/0632 |

FOREIGN PATENT DOCUMENTS

| | | |
|---|---|---|
| CN | 111133815 A | 5/2020 |
| WO | 2015084048 A1 | 6/2015 |
| WO | 2017150925 A1 | 9/2017 |

OTHER PUBLICATIONS

Huawei et al, "On UCI multiplexing", 3GPP TSG RAN WG1 Meeting AH_NR#3, R1-1715404, Nagoya, Japan, Sep. 18-21 2017, total 7 pages.
Huawei et al, "On UCI multiplexing",3GPP TSG RAN WG1 Meeting #90bis, R1-1717072, Prague, Czech Republic, Oct. 9-13, 2017, total 8 pages.
LG Electronics, UCI on PUSCH and UL channel multiplexing for NR 3GPP TSG RAN WG1 Meeting 91 Reno, R1-1719927, USA, Nov. 27-Dec. 1, 2017, 17 pages.
ZTE et al, "On short PUCCH for up to 2 bits UCI", 3GPP TSG RAN WG1 Meeting AH_NR#3, R1-1715522, Nagoya, Japan, Sep. 18-21, 2017, total 8 pages.
"3rd Generation Partnership Project; Technical Specification Group Radio Access Network; NR; User Equipment (UE) radio transmission and reception; Part 1: Range 1 Standalone (Release 15)", 3GPP TS 38.101-1 V15.0.0 (Dec. 2017), total 49 pages.
NTT Docomo, Inc., UCI on Pusch. 3GPP TSG RAN WG1 NR Ad-Hoc#2, R1-1711104, Qingdao, P.R. China, Jun. 27-30, 2017, 5 pages.
"3rd Generation Partnership Project; Technical Specification Group Radio Access Network; NR; Physical channels and modulation (Release 15)", 3GPP TS 38.211 V15.0.0 (Dec. 2017), total 73 pages.
NTT Docomo, Inc., "UCI and data multiplexing", 3GPP TSG RAN WG1 Meeting #88bis Spokane, R1-1705744, USA, Apr. 3-7, 2017, 5 pages.
"3rd Generation Partnership Project;Technical Specification Group Radio Access Network; NR; Multiplexing and channel coding (Release 15)", 3GPP TS 38.212 V15.0.0 (Dec. 2017), total 82 pages.
"3rd Generation Partnership Project;Technical Specification Group Radio Access Network; NR; Physical layer procedures for control (Release 15)", 3GPP TS 38.213 V15.0.0 (Dec. 2017), total 56 pages.
"3rd Generation Partnership Project;Technical Specification Group Radio Access Network; NR; Physical layer procedures for data (Release 15)", 3GPP TS 38.214 V15.0.0 (Dec. 2017), total 71 pages.
"3rd Generation Partnership Project;Technical Specification Group Radio Access Network; NR; NR and NG-RAN Overall Description; Stage 2 (Release 15)", 3GPP TS 38.300 V15.0.0 (Dec. 2017), total 68 pages.
"3rd Generation Partnership Project;Technical Specification Group Radio Access Network; NR; Medium Access Control (MAC) protocol specification (Release 15)", 3GPP TS 38.321 V15.0.0 (Dec. 2017), total 55 pages.
"3rd Generation Partnership Project;Technical Specification Group Radio Access Network; NR; Radio Link Control (RLC) protocol specification (Release 15)", 3GPP TS 38.322 V15.0.0 (Dec. 2017), total 32 pages.
"3rd Generation Partnership Project;Technical Specification Group Radio Access Network; NR; Radio Resource Control (RRC) protocol specification (Release 15)", 3GPP TS 38.331 V15.0.0 (Dec. 2017), total 188 pages.
Inter Digital et al., "WF on usage of 1 bit DCI", 3GPP TSG RAN WGI Meeting NR 90bis R1-1719147, Oct. 9-13, 2017, 3 pages, Prague, Czech.

* cited by examiner

00 → 00000000
01 → 00000001
10 → 11111110
11 → 11111111

UPLINK CONTROL INFORMATION TRANSMISSION METHOD AND APPARATUS

CROSS-REFERENCE TO RELATED APPLICATIONS

This application is a continuation of International Application No. PCT/CN2018/124794, filed on Dec. 28, 2018, which claims priority to Chinese Patent Application No. 201810032725.7, filed on Jan. 12, 2018. The disclosures of the aforementioned applications are hereby incorporated by reference in their entireties.

TECHNICAL FIELD

This application relates to the field of wireless communications technologies, and in particular, to an uplink control information transmission method and an apparatus.

BACKGROUND

A 5th generation (5G) mobile communications system supports an enhanced mobile broadband (eMBB) service, an ultra-reliable and low-latency communications (URLLC) service, and a massive machine-type communications (mMTC) service. Typical eMBB services include an ultra-high definition video, augmented reality (AR), virtual reality (VR), and the like. These services are mainly characterized by a large data transmission volume and a very high transmission rate. Typical URLLC services include tactile interaction applications such as wireless control in an industrial manufacturing or production process, motion control and remote repair of an unmanned vehicle and an unmanned plane, and remote surgery. These services are mainly characterized by ultra-high reliability, a low latency, a relatively small data transmission volume, and burstiness. Typical mMTC services include smart grid power distribution automation, a smart city, and the like. These services are mainly characterized by a huge quantity of web-connected devices, a relatively small data transmission volume, and insensitivity of data to a transmission latency. mMTC terminals need to meet requirements for low costs and a very long standby time.

Different services have different requirements for a mobile communications system. How to better support data transmission requirements of a plurality of different services at a same time is a technical problem that needs to be resolved in a current 5G mobile communications system. For example, how to simultaneously support a URLLC service and an eMBB service is one of discussion hotspots of the current 5G mobile communications system.

The URLLC service has a very high requirement for a latency, requires a transmission latency to be not longer than 0.5 millisecond (ms) when reliability is not considered, and requires the transmission latency to be not longer than 1 ms when 99.999% reliability is reached.

In a long term evolution (LTE) system, a minimum time scheduling unit is a transmission time interval (TTI) of a time length of 1 ms. To meet a transmission latency requirement of the URLLC service, a shorter time scheduling unit may be used for data transmission on a wireless air interface. In the 5G mobile communications system, slot-based scheduling and non-slot-based scheduling may be supported. One slot may include 12 or 14 time domain symbols. The time domain symbols herein may be orthogonal frequency division multiplexing (OFDM) symbols, or may be discrete Fourier transform spread orthogonal frequency division multiplexing (DFTS-OFDM) symbols. One slot with a subcarrier spacing of 15 kilohertz (kHz) includes 12 or 14 time domain symbols, and a corresponding time length is 1 millisecond (ms). For a slot with a subcarrier spacing of 60 kHz, a corresponding time length is shortened to 0.25 ms.

Currently, any manner of transmitting uplink control information (UCI) cannot well ensure reliability of the URLLC service.

SUMMARY

This application provides an uplink control information transmission method, a related apparatus, and a system, to better ensure high reliability of a URLLC service.

According to a first aspect, this application provides an uplink control information transmission method. The method may be performed by a network device, or may be performed by a chip or a component used for the network device. The method includes: sending first DCI; and receiving first UCI, where the first UCI is triggered by the first DCI. When a first time domain resource partially or completely overlaps a time domain resource of an uplink data channel and a first condition is met, a first symbol carries the first UCI but does not carry the uplink data channel, where the first symbol is a time domain symbol on which the first time domain resource overlaps the time domain resource of the uplink data channel, and the first time domain resource is used to transmit the first UCI.

According to a second aspect, this application provides an uplink control information transmission method. The method may be performed by a terminal device, or may be performed by a chip or a component used for the terminal device. The method includes: receiving first downlink control information DCI; and sending first uplink control information UCI, where the first UCI is triggered by the first DCI, and when a first time domain resource partially or completely overlaps a time domain resource of an uplink data channel PUSCH and a first condition is met, a first symbol carries the first UCI but does not carry the PUSCH, where the first symbol is a time domain symbol on which the first time domain resource overlaps the time domain resource of the PUSCH, and the first time domain resource is used to transmit the first UCI.

The following describes in detail the uplink control information transmission methods described in the first aspect and the second aspect.

(1) Prerequisites for providing protection for the first UCI

The first prerequisite is: A resource used to transmit the first UCI partially or completely overlaps a resource used to transmit the PUSCH in time domain.

The second prerequisite is: A resource used to transmit the first UCI partially or completely overlaps a resource used to transmit the PUSCH in time domain, and partially or completely overlaps the resource used to transmit the PUSCH in frequency domain.

The third prerequisite is: A resource used to transmit the first UCI partially or completely overlaps a resource used to transmit the PUSCH in time domain, and does not overlap the resource used to transmit the PUSCH in frequency domain, but a terminal does not have a capability of simultaneously sending a plurality of services in uplink, for example, power of the terminal is limited or the terminal uses an uplink single carrier transmission manner.

It can be learned from the foregoing three prerequisites that a basic prerequisite for providing protection for the first UCI is that the first time domain resource partially or completely overlaps the time domain resource of the PUSCH, in other words, the first UCI and the PUSCH multiplex a time domain resource. The first prerequisite indicates that when the first time domain resource partially or completely overlaps the time domain resource of the PUSCH, if the first condition is met, the terminal may provide special protection for the first UCI. The second prerequisite indicates that when the first UCI and the PUSCH multiplex a time-frequency resource, if the first condition is met, the terminal may provide special protection for the first UCI. The third prerequisite indicates that when the first UCI and the PUSCH multiplex only a time domain resource (do not multiplex a frequency domain resource), and the terminal does not have the capability of simultaneously sending a plurality of services in uplink, if the first UCI meets the first condition, the terminal may provide special protection for the first UCI.

(2) First symbol (time domain resource multiplexed by the first UCI and the PUSCH)

For example, symbols 7, 8, and 11 are used to transmit the URLLC UCI, and symbols 7 to 14 are used to transmit the PUSCH. Symbols that overlap in the symbols 7, 8, and 11 and the symbols 7 to 14 are the symbols 7, 8, and 11, and the symbols 7, 8, and 11 are the first symbol.

Specifically, on the first symbol, frequency domain resource multiplexing of the first UCI and the PUSCH may include the following several cases:

Case 1: Frequency domain resources separately occupied by the first UCI and the PUSCH on the first symbol do not overlap. In other words, the first UCI and the PUSCH separately occupy completely different frequency domain resources on the first symbol.

Case 2: Frequency domain resources separately occupied by the first UCI and the PUSCH on the first symbol partially overlap. In other words, some frequency domain resources in the frequency domain resources separately occupied by the first UCI and the PUSCH on the first symbol are the same.

Case 3: Frequency domain resources separately occupied by the first UCI and the PUSCH on the first symbol completely overlap. In other words, the frequency domain resources separately occupied by the first UCI and the PUSCH on the first symbol are completely the same.

(3) The first symbol carries the first UCI but does not carry the PUSCH

Specifically, the terminal may puncture all RBs on the first symbol for the first UCI. In other words, the first symbol is used to transmit only the first UCI but not the PUSCH.

For example, symbols 7, 8, and 11 are used to transmit the URLLC UCI, and symbols 7 to 14 are used to transmit the PUSCH. Symbols that overlap in the symbols 7, 8, and 11 and the symbols 7 to 14 are the symbols 7, 8, and 11, and the symbols 7, 8, and 11 are the first symbol. To provide special protection for the first UCI, the terminal may puncture all RBs on the symbols 7, 8, and 11. In this way, more resources may be allocated to the first UCI, and high reliability of the URLLC service is ensured.

Optionally, the terminal may alternatively set transmit power of the PUSCH on the first symbol to 0. In other words, all transmit power on the first symbol is used to transmit the first UCI. In this way, transmit power of the first UCI may be greatly improved, and reliability of the URLLC service is improved.

According to the methods described in the first aspect and the second aspect, when the URLLC UCI and the PUSCH multiplex a resource, special protection may be provided for the URLLC UCI, and the reliability of the URLLC service is ensured.

According to a third aspect, this application provides an uplink control information transmission method. The method may be performed by a network device, or may be performed by a chip or a component used for the network device. The method includes: sending first DCI; and receiving first UCI, where the first UCI is triggered by the first DCI, and when a first time domain resource partially or completely overlaps a second time domain resource and a first condition is met, an end time domain symbol carrying the first UCI is earlier than a start time domain symbol carrying second UCI, where the first time domain resource is used to transmit the first UCI, and the second time domain resource is used to transmit the second UCI.

According to a fourth aspect, this application provides an uplink control information transmission method. The method may be performed by a terminal device, or may be performed by a chip or a component used for the terminal device. The method includes: receiving first downlink control information DCI; and sending first uplink control information UCI, where the first UCI is triggered by the first DCI, and when a first time domain resource partially or completely overlaps a second time domain resource and a first condition is met, an end time domain symbol carrying the first UCI is earlier than a start time domain symbol carrying second UCI. The first time domain resource is used to transmit the first UCI, and the second time domain resource is used to transmit the second UCI.

According to a fifth aspect, this application provides an uplink control information transmission method. The method may be performed by a network device, or may be performed by a chip or a component used for the network device. The method includes: receiving first DCI; and sending first UCI, where the first UCI is triggered by the first DCI, and when a first time domain resource partially or completely overlaps a second time domain resource and a first condition is met, a first coding scheme used for the first UCI has higher data transmission reliability than a second coding scheme used for second UCI, where the first time domain resource is used to transmit the first UCI, and the second time domain resource is used to transmit the second UCI.

According to a sixth aspect, this application provides an uplink control information transmission method. The method may be performed by a terminal device, or may be performed by a chip or a component used for the terminal device. The method includes: sending first DCI; and receiving first UCI, where the first UCI is triggered by the first DCI, and when a first time domain resource partially or completely overlaps a second time domain resource and a first condition is met, a first coding scheme used for the first UCI has higher data transmission reliability than a second coding scheme used for second UCI, where the first time domain resource is used to transmit the first UCI, and the second time domain resource is used to transmit the second UCI.

It can be learned that, according to the uplink control information transmission methods described in the third aspect, the fourth aspect, the fifth aspect, and the sixth aspect, when the URLLC UCI and the eMBB UCI multiplex a resource, special protection may be provided for the URLLC UCI, and reliability of the URLLC service is ensured.

The following describes in detail the uplink control information transmission methods described in the third aspect, the fourth aspect, the fifth aspect, and the sixth aspect.

(1) Prerequisites for providing protection for the first UCI

The first prerequisite is: A resource used to transmit the first UCI partially or completely overlaps a resource used to transmit the second UCI in time domain.

The second prerequisite is: A resource used to transmit the first UCI partially or completely overlaps a resource used to transmit the second UCI in time domain, and partially or completely overlaps the resource used to transmit the second UCI in frequency domain.

The third prerequisite is: A resource used to transmit the first UCI partially or completely overlaps a resource used to transmit the second UCI in time domain, and does not overlap the resource used to transmit the second UCI in frequency domain, but a terminal does not have a capability of simultaneously sending a plurality of services in uplink, for example, power of the terminal is limited or the terminal uses an uplink single carrier transmission manner.

It can be learned from the foregoing three prerequisites that a basic prerequisite for providing protection for the first UCI is that the first time domain resource partially or completely overlaps the second time domain resource, in other words, the first UCI and the second UCI multiplex a time domain resource. The first prerequisite indicates that when the first UCI and the second UCI multiplex a time domain resource, if the first UCI meets the first condition, the terminal may provide special protection for the first UCI. The second prerequisite indicates that when the first UCI and the second UCI multiplex a time-frequency resource, if the first UCI meets the first condition, the terminal may provide special protection for the first UCI. The third prerequisite indicates that when the first UCI and the second UCI multiplex only a time domain resource (do not multiplex a frequency domain resource), and the terminal does not have the capability of simultaneously sending a plurality of services in uplink, if the first UCI meets the first condition, the terminal may provide special protection for the first UCI.

(2) The end time domain symbol carrying the first UCI is earlier than the start time domain symbol carrying the second UCI Specifically, when the first time domain resource partially or completely overlaps the second time domain resource, the end time domain symbol carrying the first UCI is earlier than the start time domain symbol carrying the second UCI. In other words, sending of the second UCI may be delayed, the first UCI is sent first, and then the second UCI is sent. In this way, it is ensured that the first UCI having a high reliability requirement is first sent, and then the second UCI is sent, so that the reliability of the URLLC service is ensured.

Further, the terminal may perform HARQ-ACK bits bundling on the second UCI whose sending is delayed. In this way, a feedback latency of the second UCI may be reduced.

Optionally, the terminal may specifically determine, based on a symbol resource on which the delayed UCI is sent, whether to perform HARQ-ACK bits bundling on the delayed second UCI. If the symbol resource is insufficient to transmit the second UCI in a HARQ-ACK bits multiplexing manner, the terminal may determine to perform HARQ-ACK bits bundling on the second UCI whose sending is delayed.

(3) The first UCI is encoded by using the first coding scheme

Specifically, the first coding scheme used for the first UCI has higher data transmission reliability than the second coding scheme used for the second UCI. The first coding scheme is different from the second coding scheme. A difference between the first coding scheme and the second coding scheme lies in but is not limited to: A quantity of bits of the first UCI may be increased after the first UCI is encoded by using the first coding scheme, and/or a quantity of bits of the second UCI is decreased after the second UCI is encoded by using the second coding scheme. Details are as follows:

The first coding scheme may include: performing redundancy coding on the first UCI. To be specific, the terminal may first add redundancy to a source of the first UCI and then perform encoding, or may first perform encoding and then perform bit-plus redundancy on first UCI obtained after encoding. In this way, the quantity of bits of the first UCI may be increased after the first UCI is encoded, so that the first UCI has a higher error correction capability than the second UCI, and high reliability of the URLLC service is ensured.

The second coding scheme may include: performing HARQ-ACK bits bundling on the second UCI. In this way, the quantity of bits of the second UCI may be decreased after the second UCI is encoded.

Optionally, redundancy coding may be performed on the first UCI, and HARQ-ACK bits bundling may be performed on the second UCI. In this way, not only transmission reliability of the first UCI may be improved, but also resources required for jointly feeding back the first UCI and the second UCI may be reduced.

With reference to the first aspect or the second aspect, with reference to the third aspect or the fourth aspect, with reference to the fifth aspect or the sixth aspect, in some optional embodiments, the first condition may include but is not limited to:

(1) A DCI format is a DCI format used for the URLLC service.

In this application, the DCI format used for the URLLC service may be referred to as a compact DCI (compact DCI, also referred to as URLLC DCI) format.

Specifically, the compact DCI format may be indicated by using, but not limited to, at least one of the following: a payload size of DCI is equal to a first value; or a payload size of DCI is equal to a first value, and a value of a DCI format identification field in the DCI is equal to a second value; or a payload size of DCI is equal to a first value, and a search space of the DCI is a terminal device UE-specific search space; or a payload size of DCI is equal to a first value, a value of a DCI format identification field in the DCI is equal to a second value, and a search space of the DCI is a UE-specific search space; or a search space of DCI is a first search space; or a check bit length of a cyclic redundancy check CRC of DCI is equal to a third value; or a check bit length of a cyclic redundancy check CRC of DCI is equal to a third value; or a radio network temporary identifier RNTI used to scramble a CRC check bit of DCI is equal to a first RNTI; or a control resource set CORESET for transmitting DCI is a first CORESET.

The several parameters: the first value, the second value, the third value, the first search space, and the first CORESET each may be configured by the network device by using higher layer signaling, for example, radio resource control (RRC) signaling or MAC CE signaling. The first value is a payload size of compact DCI. The second value is a value of a DCI format identification field in the compact DCI. The third value is a check bit length of a CRC of the compact DCI. The first search space is a search space used to detect the compact DCI. The first CORESET is a CORESET used to transmit the compact DCI.

In other words, the compact DCI format may be configured by using higher layer signaling. The compact DCI format is different from a common DCI format (for example, a DCI format used for an eMBB service). Compared with the common DCI (for example, eMBB DCI) format, the compact DCI format may have at least one of the following attributes: The first value is less than a payload size of a common DCI, the second value is different from a value of a DCI format identification field in the common DCI, and the third value is greater than a check bit length of a CRC of the common DCI. The first search space is different from a search space used to detect the common DCI. The first CORESET is different from a CORESET used to transmit the common DCI.

In this way, the terminal may distinguish, based on a payload size, whether the received first DCI is compact DCI. If the payload size of the received first DCI is equal to the first value, it may be determined that the DCI is compact DCI, in other words, the first condition is met.

In this way, the terminal may distinguish, with reference to a payload size and a DCI format identification field, whether the received first DCI is compact DCI. If the payload size of the received first DCI is equal to the first value and a value of the DCI format identification field is equal to the second value, it may be determined that the DCI is compact DCI, in other words, the first condition is met. Optionally, on a premise that payload sizes of a plurality of pieces of received DCI are consistent (payload alignment), the terminal may further distinguish compact DCI with reference to a value of a DCI format identification field.

In this way, the terminal may distinguish, based on a check bit length of a CRC, whether the received first DCI is compact DCI. If the check bit length of the CRC of the received first DCI is equal to the third value, it may be determined that the DCI is compact DCI, in other words, the first condition is met.

In this way, the terminal may distinguish, based on a detected resource position of the first DCI, whether the received first DCI is compact DCI. If the detected resource position of the first DCI is in the first search space, it may be determined that the first DCI is compact DCI, in other words, the first condition is met.

In this way, the terminal may distinguish, based on a resource occupied by the first DCI, whether the received first DCI is compact DCI. If the resource occupied by the first DCI is in the first CORESET, it may be determined that the first DCI is compact DCI, in other words, the first condition is met.

(2) The radio network temporary identifier (RNTI) used to scramble the CRC check bit of the DCI is equal to the first RNTI.

Specifically, the first RNTI may be configured by the network device by using higher layer signaling, for example, RRC signaling or MAC CE signaling. The first RNTI is used to scramble a CRC check bit of compact DCI. In other words, the RNTI used to scramble the CRC check bit of the compact DCI may be configured by using the higher layer signaling. In this way, the terminal may distinguish, based on an RNTI for scrambling a CRC check bit of DCI, whether the received first DCI is compact DCI.

(3) The search space of the DCI is the first search space.

Specifically, the first search space may be configured by the network device by using higher layer signaling, for example, RRC signaling or MAC CE signaling. DCI detected in the first search space is compact DCI. In other words, an attribute of a search space (whether the search space is a URLLC search space) may be configured by using the higher layer signaling. In this way, the terminal may distinguish, based on an attribute of a search space for detecting DCI, whether the DCI is compact DCI.

(4) The control resource set (CORESET) of the DCI is the first CORESET.

Specifically, the first CORESET may be configured by the network device by using higher layer signaling, for example, RRC signaling or MAC CE signaling. The first CORESET is used to send compact DCI. In other words, an attribute of a CORESET (whether the CORESET is a URLLC CORESET) may be configured by using the higher layer signaling. In this way, the terminal may distinguish, based on an attribute of a CORESET for receiving DCI, whether the DCI is compact DCI.

In addition to the foregoing several manners, the terminal may further determine, in the following manners, whether DCI meets the first condition.

Optionally, the terminal may determine, by using a check step, whether the DCI is compact DCI. When the DCI needs to be checked by using a check manner of two or more steps, the terminal may determine that the DCI is compact DCI, in other words, the DCI meets the first condition.

Optionally, the terminal may determine whether there is a field used to reduce an error probability in the DCI. If there is the field, it may be determined that the DCI is compact DCI, in other words, the DCI meets the first condition.

Optionally, the terminal may determine, based on a coding scheme used for the DCI, whether the DCI is compact DCI. When the coding scheme used for the DCI is a specific coding scheme, the terminal may determine that the DCI is compact DCI, in other words, the DCI meets the first condition. The specific coding scheme is one of low-density parity-check (LDPC) coding, polar coding, reed-muller coding, or dual reed-muller coding.

The foregoing implementations of determining whether the DCI meets the first condition are manners of implicitly determining whether corresponding UCI needs to be protected. In addition, whether the UCI corresponding to the DCI needs to be protected may alternatively be determined in an explicit manner. A specific solution may be as follows: The DCI may carry a one-bit field, used to distinguish whether the UCI corresponding to the DCI needs to be protected.

For example, as shown in Table 1, when a value of the bit is "0", it indicates that the UCI corresponding to the DCI does not need to be protected; or when a value of the bit is "1", it indicates that the UCI corresponding to the DCI needs to be protected.

According to a seventh aspect, this application provides a communications apparatus. The communications apparatus may include a plurality of function modules, configured to correspondingly perform the method provided in the first aspect, the third aspect, or the fifth aspect, or the method provided in any possible implementation of these aspects.

According to an eighth aspect, this application provides a communications apparatus. The communications apparatus may include a plurality of function modules, configured to correspondingly perform the method provided in the second aspect, the fourth aspect, or the sixth aspect, or the method provided in any possible implementation of these aspects.

According to a ninth aspect, this application provides a communications apparatus, configured to perform the uplink control information transmission method described in the first aspect. The communications apparatus may include a memory, and a processor and a transceiver that are coupled to the memory, where the transceiver is configured to communicate with another communications device (for example, a communications apparatus). The memory is configured to store implementation code of the uplink control information transmission method described in the first aspect, the third aspect, or the fifth aspect. The processor is configured to execute program code stored in the memory, in other words, perform the method provided in the first aspect, the third aspect, or the fifth aspect, or the method provided in any possible implementation of these aspects.

According to a tenth aspect, this application provides a communications apparatus, configured to perform the uplink control information transmission method described in the second aspect. The communications apparatus may include a memory, and a processor and a transceiver that are coupled to the memory, where the transceiver is configured to communicate with another communications device (for example, a communications apparatus). The memory is configured to store implementation code of the uplink control information transmission method described in the second aspect, the fourth aspect, or the sixth aspect. The processor is configured to execute program code stored in the memory, in other words, perform the method provided in the second aspect, the fourth aspect, or the sixth aspect, or the method provided in any possible implementation of these aspects.

According to an eleventh aspect, a communications system is provided. The communications system includes a terminal and a network device. The network device may be the communications apparatus described in the seventh aspect or the ninth aspect. The terminal may be the communications apparatus described in the eighth aspect or the tenth aspect.

According to a twelfth aspect, a computer-readable storage medium is provided. The readable storage medium stores an instruction, and when the instruction is run on a computer, the computer is enabled to perform the uplink control information transmission method described in the first aspect, the third aspect, or the fifth aspect, or the method provided in any possible implementation of these aspects.

According to a thirteenth aspect, another computer-readable storage medium is provided. The readable storage medium stores an instruction, and when the instruction is run on a computer, the computer is enabled to perform the uplink control information transmission method described in the second aspect, the fourth aspect, or the sixth aspect, or the method provided in any possible implementation of these aspects.

According to a fourteenth aspect, a computer program product including an instruction is provided. When the computer program product is run on a computer, the computer is enabled to perform the uplink control information transmission method described in the first aspect, the third aspect, or the fifth aspect, or the method provided in any possible implementation of these aspects.

According to a fifteenth aspect, another computer program product including an instruction is provided. When the computer program product is run on a computer, the computer is enabled to perform the uplink control information transmission method described in the second aspect, the fourth aspect, or the sixth aspect, or the method provided in any possible implementation of these aspects.

BRIEF DESCRIPTION OF THE DRAWINGS

To describe technical solutions in embodiments of this application or in the background more clearly, the following describes the accompanying drawings required for describing the embodiments of this application or the background.

DETAILED DESCRIPTION OF ILLUSTRATIVE EMBODIMENTS

Terms used in the implementation part of this application are only used to explain specific embodiments of this application, and are not intended to limit this application.

Figure 1:
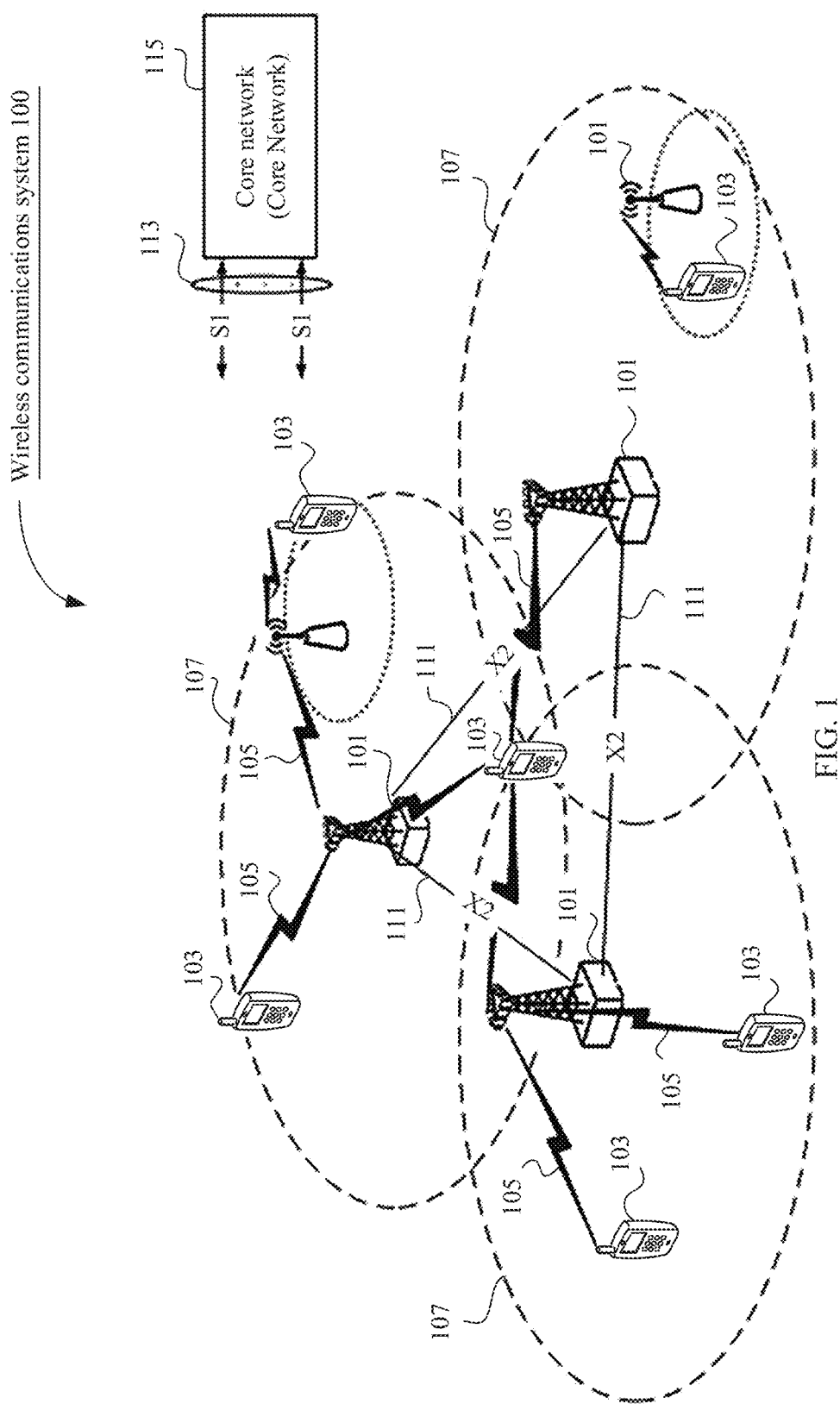
FIG. 1 is a schematic architectural diagram of a wireless communications system according to this application.

FIG. 1 shows a wireless communications system according to this application. The wireless communications system is not limited to an LTE system, and may alternatively be a 5th generation 5G mobile communications system, a new radio (NR) system, a future mobile communications system, or the like. As shown in FIG. 1, the wireless communications system 100 may include one or more network devices 101, one or more terminals 103, and a core network 115.

The network device 101 may be a base station. The base station may be configured to communicate with one or more terminals, or may be configured to communicate with one or more base stations having some terminal functions (for example, communication between a macro base station and a micro base station). The base station may be an evolved NodeB (eNB) in an LTE system, or a base station in a 5G system or a new radio (NR) system. Alternatively, the base station may be an access point (AP), a transmission node (Trans TRP), a central unit (CU), or another network entity, and may include some or all of functions of the foregoing network entities. A specific technology and a specific device form that are used by the network device are not limited in the embodiments of this application.

The terminal 103 may be distributed everywhere in the wireless communications system 100, and may be static, or may be mobile. The terminal 103 may also be referred to as user equipment (UE), a mobile station (MS), a mobile terminal (MT), or the like. The terminal 103 may be a mobile phone, a tablet computer (Pad), a computer with a wireless transceiver function, a virtual reality (VR) terminal, an augmented reality (AR) terminal, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

Specifically, the network device 101 may be configured to communicate with the terminal 103 through a wireless interface 105 under control of a network device controller (not shown). In some embodiments, the network device controller may be a part of the core network 115, or may be integrated into the network device 101. Specifically, the network device 101 may be configured to transmit control information or user data to the core network 115 through a backhaul interface 113 (for example, an S1 interface). Specifically, network devices 101 may also directly or indirectly communicate with each other through a backhaul interface 111 (for example, an X2 interface).

In this application, simultaneous transmission of a plurality of services can be supported between the network device 101 and the terminal 103. For example, the services may be three major services: eMBB, URLLC, and eMTC supported by 5G and future new radio (NR). It should be understood that the URLLC service is different from the eMBB service, and a reliability requirement of URLLC is very high. To ensure reliability of the URLLC service, reliability of URLLC UCI needs to be ensured.

In this application, the UCI may include but is not limited to: a scheduling request (SR), a HARQ ACK/NACK corresponding to a downlink data packet on a PDSCH, and channel state information (CSI). The CSI may include a downlink channel quality indicator (CQI), a rank indication (RI) and a precoding matrix indicator (PMI) that are related to MIMO feedback. The CSI may further include periodic CSI and aperiodic CSI. A URLLC HARQ ACK/NACK is triggered by DCI used for scheduling a URLLC PDSCH. A URLLC aperiodic CSI is triggered by DCI used for scheduling a URLLC PUSCH. An eMBB HARQ ACK/NACK is triggered by DCI used for scheduling an eMBB PDSCH. An eMBB aperiodic CSI is triggered by DCI used for scheduling an eMBB PUSCH.

The UCI may be transmitted on a PUSCH, or may be transmitted on a PUCCH. Currently, the reliability requirement of the URLLC service is not specially considered in an existing UCI feedback manner, and reliability of the URLLC service cannot be well ensured. The following separately analyzes, for two different scenarios, problems existing in transmitting the URLLC UCI in the existing UCI feedback manner.

Scenario 1: URLLC UCI and eMBB UCI are simultaneously transmitted.

Figure 2:
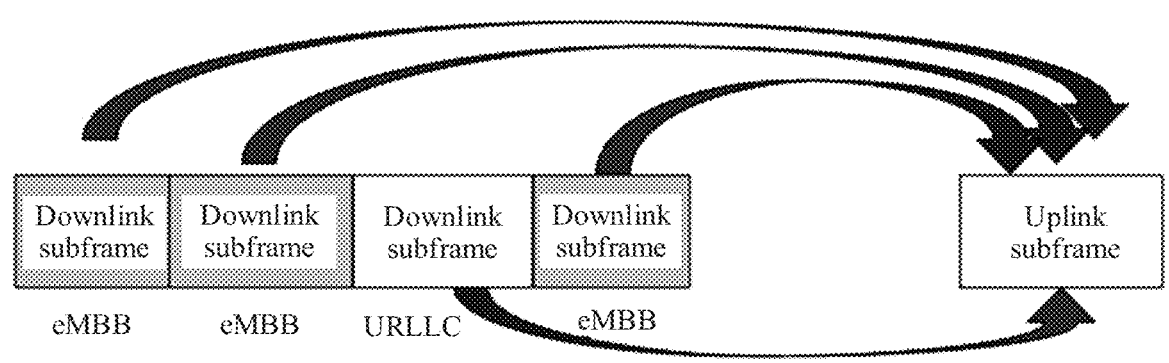
FIG. 2 is a schematic diagram of URLLC UCI and eMBB UCI multiplexing transmission in an existing UCI feedback manner.

In a time division duplexing (TDD) scenario, for downlink data received by a terminal in a plurality of downlink subframes, the terminal needs to feed back ACKs/NACKs in a same uplink subframe, in other words, the terminal needs to feed back a plurality of ACKs/NACKs in a same uplink subframe. It is assumed that ACKs/NACKs of four downlink subframes need to be fed back in one uplink subframe, and URLLC data and eMBB data are separately scheduled in the four downlink subframes, as shown in FIG. 2.

For UCI transmission on a PUCCH, there are two existing feedback manners: HARQ-ACK bits bundling (HARQ feedback bits bundling) and HARQ-ACK bits multiplexing (HARQ feedback bits multiplexing). HARQ-ACK bits bundling is to perform a logical AND operation on ACKs/NACKs of a plurality of downlink subframes. For example, if the ACKs/NACKs of the four downlink subframes shown in FIG. 2 are respectively "0", "0", "1", and "1" (where "1" represents an ACK, and "0" represents a NACK), after HARQ-ACK bits bundling (to be specific, 0&0&1&1=0) is performed, one-bit "0" is fed back, and it indicates that each of the four downlink subframes (including URLLC downlink subframe) needs to be retransmitted. This also means that a network device considers that the terminal device correctly receives URLLC service data only when both URLLC downlink data and eMBB downlink data are correctly received by the terminal. This is equivalent to that URLLC ACK feedbacks can be successfully decoded only when feedbacks in the eMBB subframe are all ACKs. HARQ-ACK bits multiplexing is to directly feed back four-bit "1101".

It can be learned that in the existing HARQ-ACK bits multiplexing manner, no special protection is designed for a URLLC ACK/NACK to ensure high reliability of the URLLC UCI, the URLLC ACK/NACK is further affected by an eMBB ACK/NACK, and reliability of the URLLC UCI cannot be ensured.

For the scenarios, to ensure the reliability of the URLLC UCI, a new feedback rule is designed in this application for the scenario in which the eMBB ACK/NACK and the URLLC ACK/NACK need to be fed back simultaneously. For details, refer to subsequent embodiments. Details are not described herein.

Scenario 2: URLLC UCI and an eMBB PUSCH are simultaneously transmitted.

In a scenario in which the UCI is carried on the PUSCH for transmission, in a current technical solution, a beta offset field in DCI used to send an uplink grant (UL grant) is used to indicate a quantity of resource elements (REs) occupied by the UCI. Herein, a value of the beta offset is related to a code rate. In other words, the value of the beta offset may be used to indicate the quantity of resources occupied by the UCI.

Specifically, the DCI is a beta offset value that is configured for an ACK/a NACK of a PDSCH before the UL grant is sent. However, a URLLC service is usually a burst URLLC service. For a URLLC service that bursts after the UL grant is sent, a quantity of REs occupied by URLLC UCI is not indicated in the DCI used for sending the UL grant, there is no special mechanism to protect the quantity of resources occupied by the URLLC UCI, and consequently, transmission reliability of the URLLC UCI cannot be ensured.

Figure 3:
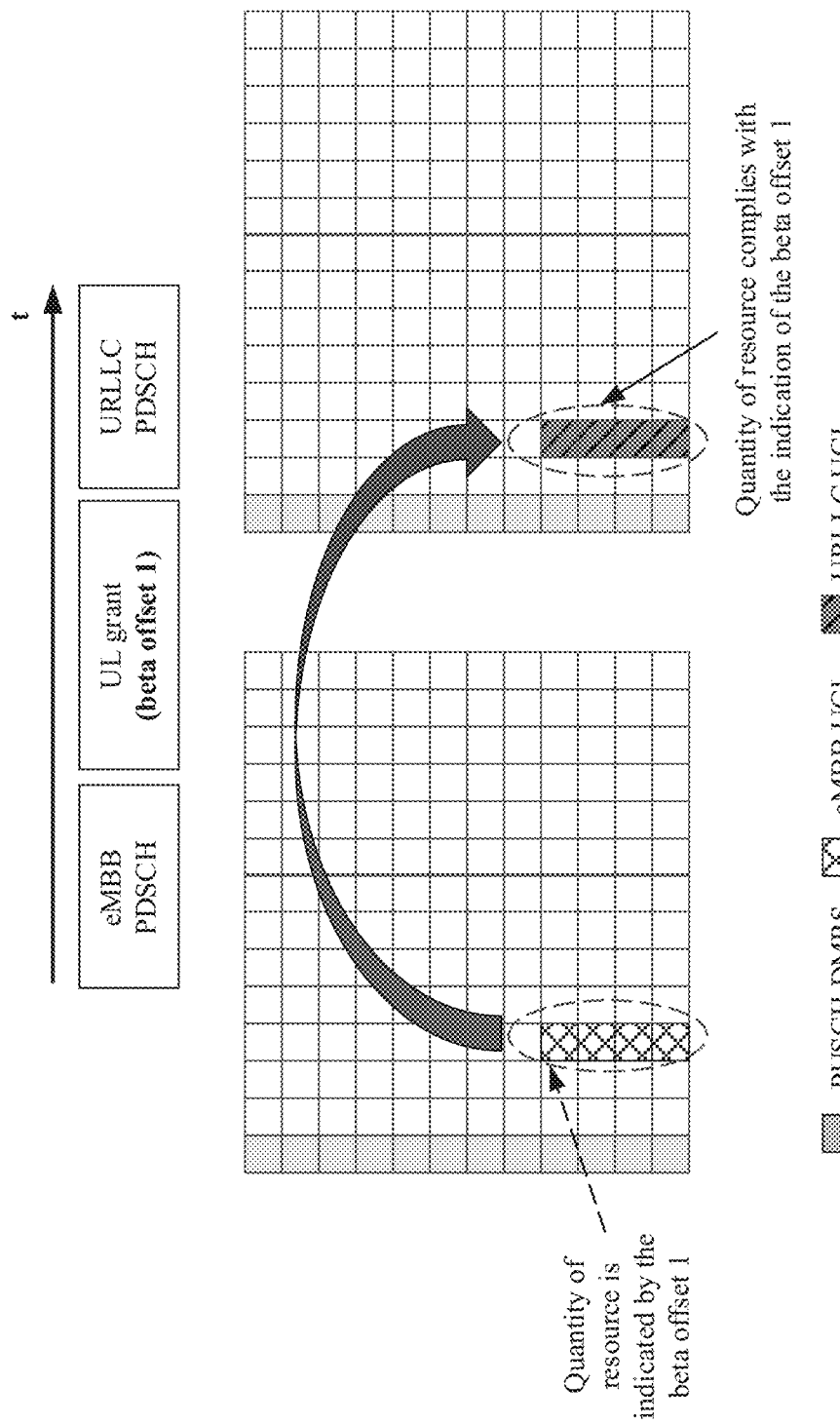
FIG. 3 is a schematic diagram of URLLC UCI and eMBB PUSCH multiplexing transmission in an existing UCI feedback manner.

For example, as shown in FIG. 3, an eMBB PDSCH is before a UL grant, and a URLLC PDSCH bursts after the UL grant. In DCI used for sending the UL grant, a beta offset value, namely, a beta offset 1, is configured only for the eMBB PDSCH. As shown in FIG. 3, the beta offset 1 indicates that a quantity of resources occupied by eMBB UCI is four REs. For the URLLC PDSCH that appears after the UL grant, a beta offset value is not configured for UCI (namely, URLLC UCI) of the URLLC PDSCH in the DCI used for sending the UL grant. In this way, a quantity of resources occupied by the URLLC UCI of the URLLC PDSCH that appears after the UL grant can only comply with the quantity of resources (namely, the four REs) indicated by the beta offset 1 configured for the eMBB UCI, and more resources cannot be allocated to the URLLC UCI in particular. Consequently, reliability of the URLLC UCI cannot be ensured.

In this application, to ensure reliability of the URLLC, special protection may be provided for the URLLC UCI. A protection manner may include but is not limited to: allocating more resources (for example, a time domain resource, a frequency domain resource, a code domain resource, and a power domain resource) to the URLLC UCI, using a coding scheme with higher reliability for the URLLC UCI, and the like. The protection manner may further include: transmitting the URLLC UCI through multi-cell cooperation. For example, to improve reliability of a cell edge user, the manner of transmitting the URLLC UCI through multi-cell cooperation is used. In other words, the URLLC UCI needs to be sent to network devices (for example, base stations) of a plurality of cells. In this way, the URLLC UCI naturally has higher reliability. For a transmission method used to provide special protection for the URLLC UCI that is provided in this application, refer to subsequent embodiments. Details are not described herein.

It should be noted that the wireless communications system 100 shown in FIG. 1 is only intended to more clearly describe technical solutions in this application, but is not intended to limit this application. A person of ordinary skill in the art may know that as a network architecture evolves and a new service scenario emerges, the technical solutions provided in this application are also applicable to a similar technical problem.

Figure 4:
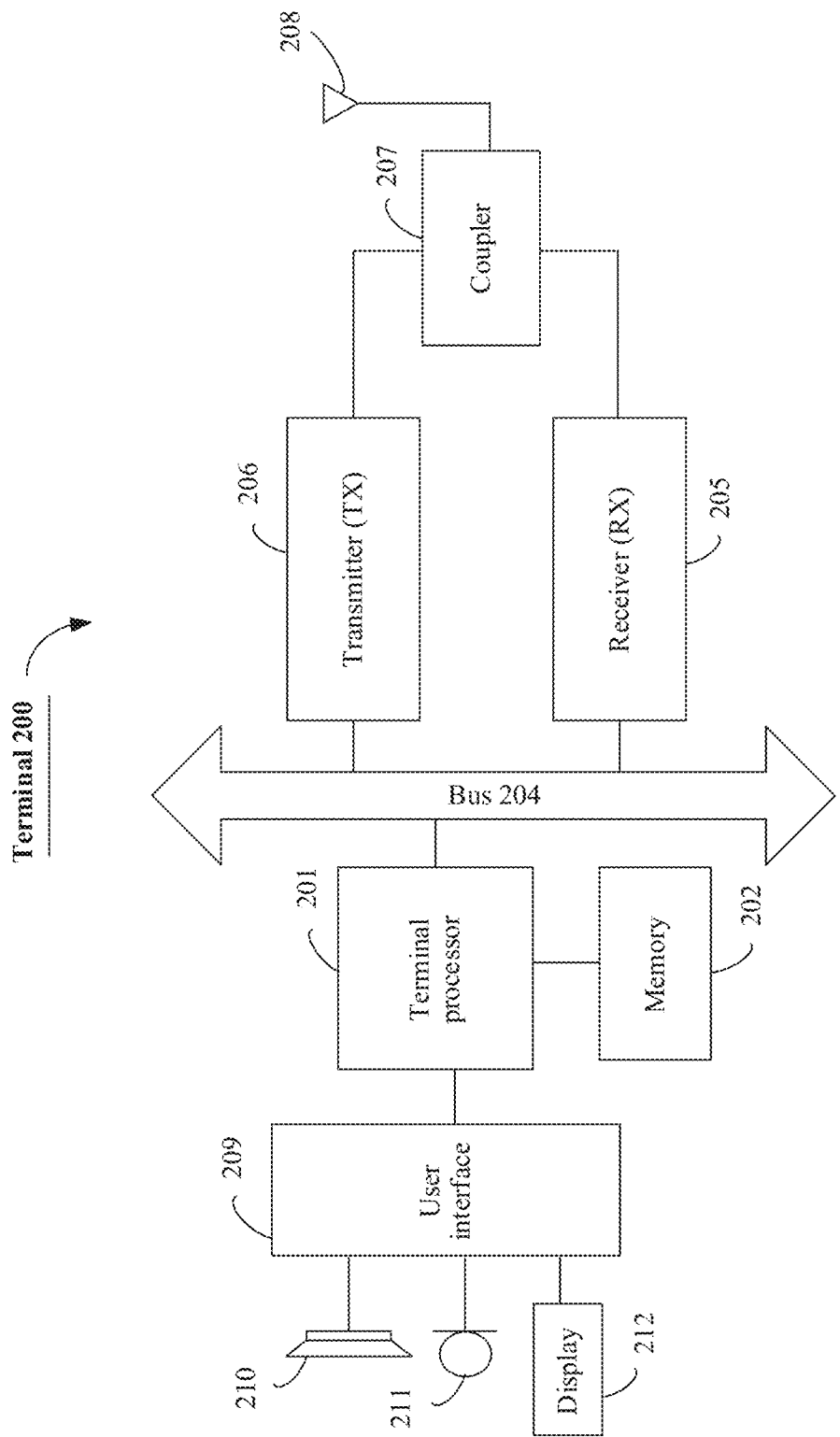
FIG. 4 is a schematic diagram of a hardware architecture of a terminal according to an embodiment of this application.

FIG. 4 shows a terminal 200 according to some embodiments of this application. As shown in FIG. 4, the terminal 200 may include: one or more terminal processors 201, a memory 202, a receiver 205, a transmitter 206, a coupler 207, an antenna 208, a user interface 209, and an input/output module (including an audio input/output module 210, a key input module 211, a display 212, and the like). These components may be connected by using a bus 204 or in another manner. In FIG. 4, for example, the components are connected by using the bus.

The transmitter 206 may be configured to perform transmission processing, for example, signal modulation, on a signal output by the terminal processor 201. The receiver 205 may be configured to perform reception processing, for example, signal demodulation, on a mobile communication signal received by the antenna 208. In some embodiments of this application, the transmitter 206 and the receiver 205 may be considered as a wireless modem. The terminal 200 may include one or more transmitters 206 and one or more receivers 205. The antenna 208 may be configured to convert electromagnetic energy in a transmission line into an electromagnetic wave in free space, or convert an electromagnetic wave in free space into electromagnetic energy in a transmission line. The coupler 207 is configured to divide the mobile communication signal received by the antenna 208 into a plurality of signals and distribute the plurality of signals to a plurality of receivers 205.

In addition to the transmitter 206 and the receiver 205 shown in FIG. 4, the terminal 200 may further include another communications component, for example, a GPS module, a Bluetooth module, a wireless fidelity (Wi-Fi) module, or the like. Not limited to the foregoing described wireless communication signal, the terminal 200 may further support another wireless communication signal, for example, a satellite signal and a short-wave signal. Not limited to wireless communication, the terminal 200 may be further provided with a wired network interface (for example, a LAN interface) to support wired communication.

The input/output module may be configured to implement interaction between the terminal 200 and a user or an external environment. The input/output module may mainly include: the audio input/output module 210, the key input module 211, the display 212, and the like. Specifically, the input/output module may further include: a camera, a touchscreen, a sensor, and the like. Each input/output module communicates with the terminal processor 201 through the user interface 209.

The memory 202 is coupled to the terminal processor 201, and is configured to store various software programs and/or a plurality of sets of instructions. Specifically, the memory 202 may include a high-speed random access memory, and may further include a non-volatile memory, for example, one or more disk storage devices, a flash memory device, or another non-volatile solid-state storage device. The memory 202 may store an operating system (referred to as a system hereinafter), for example, an embedded operating system such as ANDROID, iOS, WINDOWS, or LINUX. The memory 202 may further store a network communications program. The network communications program may be used for communicating with one or more additional devices, one or more terminal devices, or one or more network devices. The memory 202 may further store a user interface program. The user interface program may vividly display content of an application program by using a graphical operating window, and receive, by using an input control such as a menu, a dialog box, and a key, a control operation performed by a user on the application program.

In some embodiments of this application, the memory 202 may be configured to store a program for implementing, on a terminal 200 side, the uplink control information transmission method provided in one or more embodiments of this application. For implementation of the uplink control information transmission method provided in one or more embodiments of this application, refer to the following embodiments.

The terminal processor 201 may be configured to read and execute a computer-readable instruction. Specifically, the terminal processor 201 may be configured to invoke a program stored in the memory 212, for example, the program for implementing, on the terminal 200 side, the uplink control information transmission method provided in one or more embodiments of this application, and execute an instruction included in the program.

It may be understood that the terminal 200 may be the terminal 103 in the wireless communications system wo shown in FIG. 1, and may be implemented as a mobile device, a mobile station, a mobile unit, a radio unit, a remote unit, a user agent, a mobile client, or the like.

It should be noted that the terminal 200 shown in FIG. 4 is only an implementation of the embodiments of this application. In actual application, the terminal 200 may further include more or fewer components, and this is not limited herein.

Figure 5:
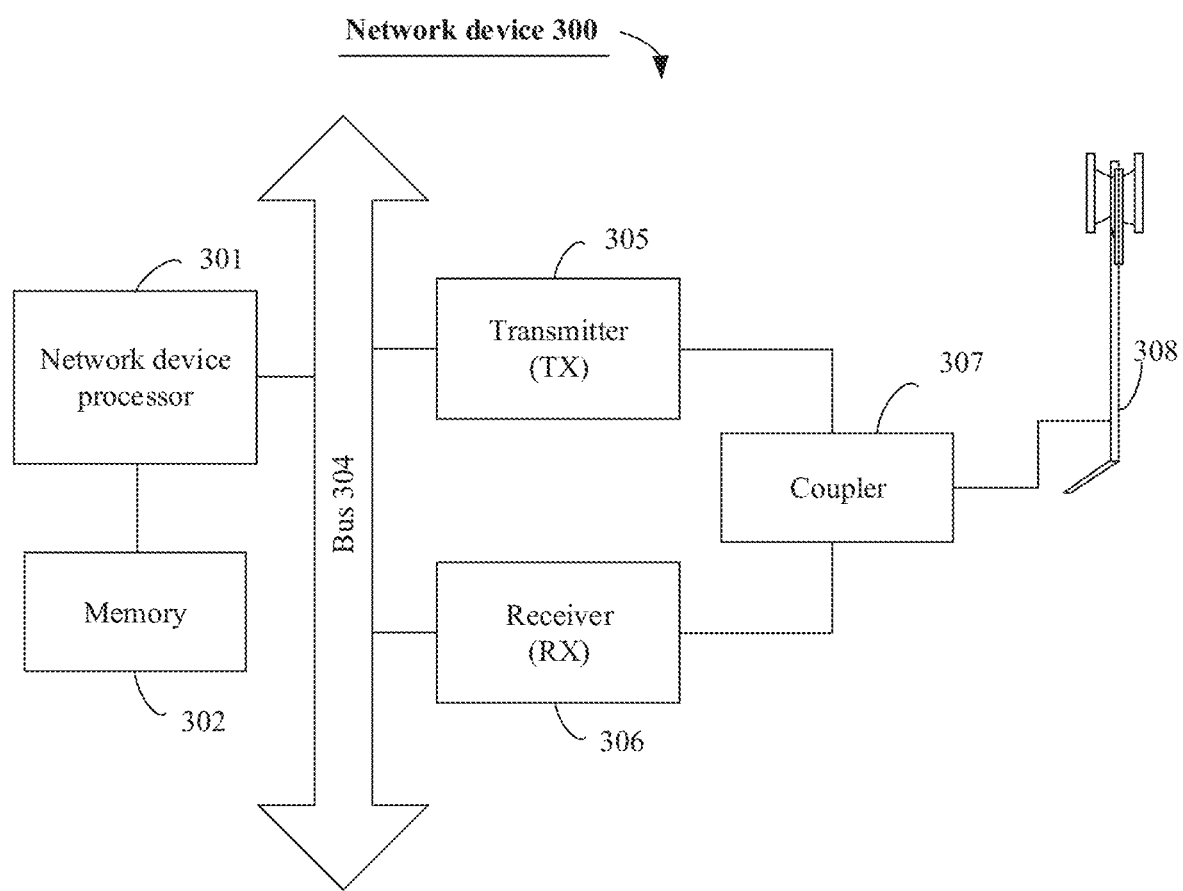
FIG. 5 is a schematic diagram of a hardware architecture of a base station according to an embodiment of this application.

FIG. 5 shows a network device 300 provided in some embodiments of this application. As shown in FIG. 5, the network device 300 may include: one or more network device processors 301, a memory 302, a transmitter 305, a receiver 306, a coupler 307, and an antenna 308. These components may be connected by using a bus 304 or in another manner. In FIG. 5, for example, the components are connected by using the bus.

The transmitter 305 may be configured to perform transmission processing, for example, signal modulation, on a signal output by the network device processor 301. The receiver 306 may be configured to perform reception processing, for example, signal demodulation, on a mobile communication signal received by the antenna 308. In some embodiments of this application, the transmitter 305 and the receiver 306 may be considered as a wireless modem. The network device 300 may include one or more transmitters 305 and one or more receivers 306. The antenna 308 may be configured to convert electromagnetic energy in a transmission line into an electromagnetic wave in free space, or convert an electromagnetic wave in free space into electromagnetic energy in a transmission line. The coupler 307 may be configured to divide the mobile communication signal into a plurality of signals and distribute the plurality of signals to a plurality of receivers 306.

The memory 302 is coupled to the network device processor 301, and is configured to store various software programs and/or a plurality of sets of instructions. Specifically, the memory 302 may include a high-speed random access memory, and may further include a non-volatile memory, for example, one or more disk storage devices, a flash device, or another non-volatile solid-state storage device. The memory 302 may store an operating system (referred to as a system hereinafter), for example, an embedded operating system such as uCOS, VxWorks, or RTLinux. The memory 302 may further store a network communications program. The network communications program may be used for communicating with one or more additional devices, one or more terminal devices, or one or more network devices.

The network device processor 301 may be configured to manage a radio channel, establish and disconnect a call and a communication link, and provide cell handover control for a user within a local control area. Specifically, the network device processor 301 may include: an administration module/communication module (AM/CM) (a center for speech channel switching and information exchange), a basic module (BM) (configured to implement call processing, signaling processing, radio resource management, radio link management, and circuit maintenance functions), a transcoder and sub-multiplexer (TCSM) (configured to implement multiplexing/demultiplexing and transcoding functions), and the like.

In the embodiments of this application, the network device processor 301 may be configured to read and execute a computer-readable instruction. Specifically, the network device processor 301 may be configured to invoke a program stored in the memory 302, for example, a program for implementing, on a network device 300 side, the uplink control information transmission method provided in one or more embodiments of this application, and execute an instruction included in the program.

It can be understood that the network device 300 may be a base station 101 in the wireless communications system 100 shown in FIG. 1, and may be implemented as a base transceiver station, a wireless transceiver, a basic service set (BSS), an extended service set (ESS), a NodeB, an eNodeB, an access point, a TRP, or the like.

It should be noted that the network device 300 shown in FIG. 5 is only an implementation of the embodiments of this application. In actual application, the network device 300 may further include more or fewer components, and this is not limited herein.

Based on the embodiments corresponding to the wireless communications system 100, the terminal 200, and the network device 300, an embodiment of this application provides an uplink control information transmission method. Details are described below.

A. A main design concept of this application may include: A terminal may determine, based on received first DCI, whether corresponding UCI (namely, UCI triggered by the DCI) needs to be protected, and if the UCI needs to be protected, the terminal designs a special transmission policy for the UCI, to protect the UCI and ensure reliability of a URLLC service.

In this application, the special transmission policy may be superior to a common UCI transmission policy in at least one of the following aspects: a transmission resource, a coding scheme, a cascade sequence of bitstreams, a sending sequence, and the like. That the special transmission policy is superior in terms of a transmission resource may mean that more resources are allocated to the URLLC UCI. That the special transmission policy is superior in terms of a coding scheme may mean that a coding scheme used for the URLLC UCI has a higher error correction capability than a coding scheme used for common UCI. That the special transmission policy is superior in terms of a cascade sequence of bitstreams may mean that a bitstream of the URLLC UCI is cascaded before a bitstream of the common UCI. That the special transmission policy is superior in terms of a sending sequence may mean that the URLLC UCI is transmitted before the common UCI. Specific implementation of the special transmission policy is described in detail in subsequent content, and details are not described herein.

In this application, the common UCI may include but is not limited to eMBB UCI, and a reliability requirement of a PDSCH to which the common UCI responds is lower than a reliability requirement of a PDSCH to which the URLLC UCI responds. In this application, the URLLC UCI may be referred to as first UCI, and the common UCI may be referred to as second UCI. Herein, the first UCI may further include UCI of a new service type defined in a future communications standard, and is not limited to a URLLC service. The new service type is similar to a URLLC service type, and has a relatively high reliability requirement.

B. To protect the first UCI, this application mainly provides the following several solutions. Solution 1 discusses a method for protecting URLLC UCI in a scenario in which URLLC UCI and a PUSCH multiplex a resource. Solutions 2 to 4 discuss methods for protecting URLLC UCI in a scenario in which URLLC UCI and eMBB UCI multiplex a resource.

The following describes the main solutions:

Solution 1: A terminal determines, based on received first DCI, whether the DCI meets a first condition; and if the DCI meets the first condition, on a premise that first UCI and a PUSCH multiplex a resource, the terminal sends the first UCI on a symbol multiplexed by the first UCI and the PUSCH, but does not send the PUSCH. In other words, the URLLC UCI with a high reliability requirement is specially considered, to ensure reliability of a URLLC service.

For specific implementation of the solution 1, refer to subsequent Embodiment 1. Details are not described herein.

Solution 2: A terminal determines, based on received first DCI, whether the DCI meets a first condition; and if the DCI meets the first condition, on a premise that first UCI and second UCI multiplex a resource, the terminal first sends the first UCI and then sends the second UCI. In other words, an end time domain symbol carrying the first UCI is earlier than a start time domain symbol carrying the second UCI. In other words, it is ensured that the URLLC UCI with a high reliability requirement is sent first, and then the eMBB UCI is sent, to ensure a low latency of a URLLC service.

For specific implementation of the solution 2, refer to subsequent Embodiment 2. Details are not described herein.

Solution 3: A terminal determines, based on received first DCI, whether the DCI meets a first condition; and if the DCI meets the first condition, on a premise that first UCI and second UCI multiplex a resource, the first UCI is encoded by using a first coding scheme, and the first coding scheme has higher data transmission reliability than a second coding scheme used for the second UCI. In other words, a better coding scheme is used for the URLLC UCI, to ensure high reliability of a URLLC service.

For specific implementation of the solution 3, refer to subsequent Embodiment 2. Details are not described herein.

C. Each of the foregoing solutions relates to how to determine whether the DCI meets the first condition. If it is determined that the DCI meets the first condition, it may be determined that the UCI corresponding to the DCI needs to be protected.

In this application, for the first DCI received by the terminal, the first condition may include but is not limited to:

(1) A DCI format is a DCI format used for the URLLC service.

In this application, the DCI format used for the URLLC service may be referred to as a compact DCI (also referred to as URLLC DCI) format.

Specifically, the compact DCI format may be indicated by using, but not limited to, at least one of the following: a payload size of DCI is equal to a first value; or a payload size of DCI is equal to a first value, and a value of a DCI format identification field in the DCI is equal to a second value; or a payload size of DCI is equal to a first value, and a search space of the DCI is a terminal device UE-specific search space; or a payload size of DCI is equal to a first value, a value of a DCI format identification field in the DCI is equal to a second value, and a search space of the DCI is a UE-specific search space; or a search space of DCI is a first search space; or a check bit length of a cyclic redundancy check CRC of DCI is equal to a third value; or a check bit length of a cyclic redundancy check CRC of DCI is equal to a third value; or a radio network temporary identifier RNTI used to scramble a CRC check bit of DCI is equal to a first RNTI; or a control resource set CORESET for transmitting DCI is a first CORESET.

The several parameters: the first value, the second value, the third value, the first search space, and the first CORESET each may be configured by a network device by using higher layer signaling, for example, radio resource control (RRC) signaling or MAC CE signaling. The first value is a payload size of compact DCI. The second value is a value of a DCI format identification field in the compact DCI. The third value is a check bit length of a CRC of the compact DCI. The first search space is a search space used to detect the compact DCI. The first CORESET is a CORESET used to transmit the compact DCI.

In other words, the compact DCI format may be configured by using higher layer signaling. The compact DCI format is different from a common DCI format (for example, a DCI format used for an eMBB service). Compared with the common DCI (for example, eMBB DCI) format, the compact DCI format may have at least one of the following attributes: The first value is less than a payload size of a common DCI, the second value is different from a value of a DCI format identification field in the common DCI, and the third value is greater than a check bit length of a CRC of the common DCI. The first search space is different from a search space used to detect the common DCI. The first CORESET is different from a CORESET used to transmit the common DCI.

In this way, the terminal may distinguish, based on a payload size, whether the received first DCI is compact DCI. If the payload size of the received first DCI is equal to the first value, it may be determined that the DCI is compact DCI, in other words, the first condition is met.

In this way, the terminal may distinguish, with reference to a payload size and a DCI format identification field, whether the received first DCI is compact DCI. If the payload size of the received first DCI is equal to the first value and a value of the DCI format identification field is equal to the second value, it may be determined that the DCI is compact DCI, in other words, the first condition is met. Optionally, on a premise that payload sizes of a plurality of pieces of received DCI are consistent (payload alignment), the terminal may further distinguish compact DCI with reference to a value of a DCI format identification field.

In this way, the terminal may distinguish, based on a check bit length of a CRC, whether the received first DCI is compact DCI. If the check bit length of the CRC of the received first DCI is equal to the third value, it may be determined that the DCI is compact DCI, in other words, the first condition is met.

In this way, the terminal may distinguish, based on a detected resource position of the first DCI, whether the received first DCI is compact DCI. If the detected resource position of the first DCI is in the first search space, it may be determined that the first DCI is compact DCI, in other words, the first condition is met.

In this way, the terminal may distinguish, based on a resource occupied by the first DCI, whether the received first DCI is compact DCI. If the resource occupied by the first DCI is in the first CORESET, it may be determined that the first DCI is compact DCI, in other words, the first condition is met.

(2) The radio network temporary identifier (RNTI) used to scramble the CRC check bit of the DCI is equal to the first RNTI.

Specifically, the first RNTI may be configured by the network device by using higher layer signaling, for example, RRC signaling or MAC CE signaling. The first RNTI is used to scramble a CRC check bit of compact DCI. In other words, the RNTI used to scramble the CRC check bit of the compact DCI may be configured by using the higher layer signaling. In this way, the terminal may distinguish, based on an RNTI for scrambling a CRC check bit of DCI, whether the received first DCI is compact DCI.

(3) The search space of the DCI is the first search space.

Specifically, the first search space may be configured by the network device by using higher layer signaling, for example, RRC signaling or MAC CE signaling. DCI detected in the first search space is compact DCI. In other words, an attribute of a search space (whether the search space is a URLLC search space) may be configured by using the higher layer signaling. In this way, the terminal may distinguish, based on an attribute of a search space for detecting DCI, whether the DCI is compact DCI.

(4) The control resource set (CORESET) of the DCI is the first CORESET.

Specifically, the first CORESET may be configured by the network device by using higher layer signaling, for example, RRC signaling or MAC CE signaling. The first CORESET is used to send compact DCI. In other words, an attribute of a CORESET (whether the CORESET is a URLLC CORESET) may be configured by using the higher layer signaling. In this way, the terminal may distinguish, based on an attribute of a CORESET for receiving DCI, whether the DCI is compact DCI.

Figure 6:
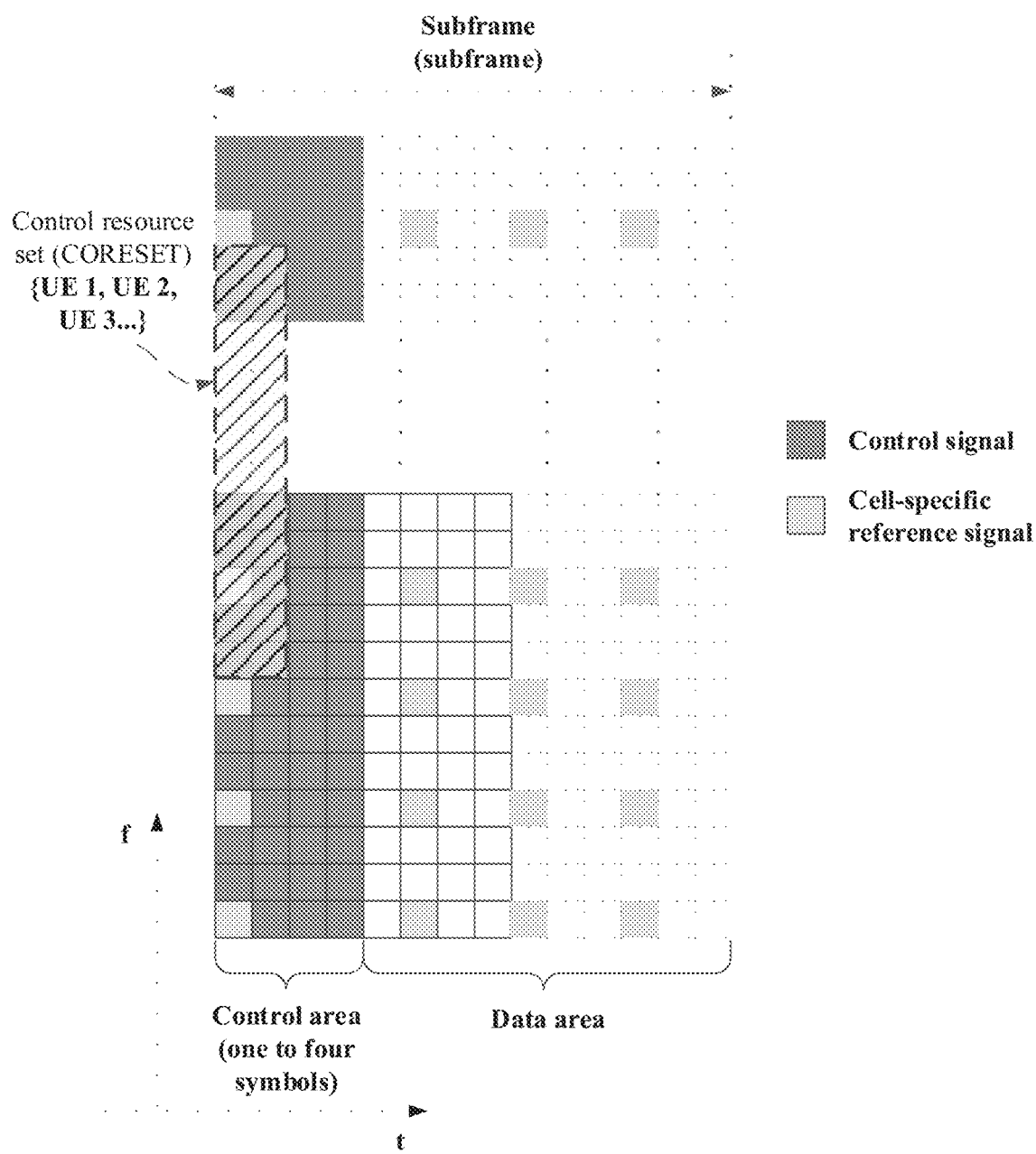
FIG. 6 is a schematic diagram of a control resource set according to this application.

The following describes a concept of a control resource set. As shown in FIG. 6, a CORESET is a time-frequency resource in a control area. In FIG. 6, first four of 14 time domain symbols are used as a control area, and only some resources in the first four time domain symbols may be defined as resources corresponding to one CORESET. One CORESET corresponds to one group of users (such as UE 1, UE 2, and UE 3). Physical downlink control channels (PDCCHs) of the group of users are sent on the CORESET. In one CORESET, each user has one search space, and a size of a resource in the search space is less than or equal to that of a resource in the CORESET. One user may correspond to a plurality of CORESETs. Numerology associated with these CORESETs may be the same or different. The numerology herein may include a subcarrier spacing and a cyclic prefix (CP) length.

In addition to the foregoing several manners, the terminal may further determine, in the following manners, whether DCI meets the first condition.

Optionally, the terminal may determine, by using a check step, whether the DCI is compact DCI. When the DCI needs to be checked by using a check manner of two or more steps, the terminal may determine that the DCI is compact DCI, in other words, the DCI meets the first condition.

Optionally, the terminal may determine whether there is a field used to reduce an error probability in the DCI. If there is the field, it may be determined that the DCI is compact DCI, in other words, the DCI meets the first condition.

Optionally, the terminal may determine, based on a coding scheme used for the DCI, whether the DCI is compact DCI. When the coding scheme used for the DCI is a specific coding scheme, the terminal may determine that the DCI is compact DCI, in other words, the DCI meets the first condition. The specific coding scheme is one of low-density parity-check (LDPC) coding, polar coding, reed-muller coding, or dual reed-muller coding.

The foregoing implementations of determining whether the DCI meets the first condition are manners of implicitly determining whether corresponding UCI needs to be protected. In addition, whether the UCI corresponding to the DCI needs to be protected may alternatively be determined in an explicit manner. A specific solution may be as follows: The DCI may carry a one-bit field, used to distinguish whether the UCI corresponding to the DCI needs to be protected.

For example, as shown in Table 1, when a value of the bit is "0", it indicates that the UCI corresponding to the DCI does not need to be protected; or when a value of the bit is "1", it indicates that the UCI corresponding to the DCI needs to be protected. The following mapping relationship may be predefined by a protocol, or may be semi-statically configured by using RRC signaling.

TABLE 1

| Bit information | UCI type |
| --- | --- |
| 0 | Common UCI |
| 1 | UCI needing to be protected |

Whether the DCI includes the one-bit field may be predefined by a protocol, or may be configured by using RRC signaling. The mapping relationship shown in Table 1 as an example may be predefined by the protocol, or may be configured by using the RRC signaling.

In this application, the first DCI may be compact DCI/URLLC DCI (namely, DCI that meets the first condition), or may be common DCI (for example, eMBB DCI). It may be understood that a reliability requirement of a PDSCH (for example, a URLLC PDSCH) for scheduling the first DCI that meets the first condition is higher than a reliability requirement of a PDSCH (for example, an eMBB PDSCH) for scheduling common DCI. This application provides special protection for UCI corresponding to compact DCI/URLLC DCI (namely, UCI triggered by the DCI), so that high reliability of a URLLC service may be ensured.

It should be noted that for resource concepts in this application, such as a symbol, a resource element (RE), a resource block (RB), a CORESET, and a search space, and for channel concepts designed in this application, such as a PDSCH and a PDCCH, refer to an existing definition (for example, an existing stipulation in the LTE standard or an NR communications system), but they are not limited to the existing definition. Definitions or names of these resource concepts and these channel concepts in a future communications standard may be different, and this does not affect implementation of this application.

The following describes in detail the technical solutions provided in this application by using a plurality of embodiments with reference to the accompanying drawings.

(1) Embodiment 1

In this embodiment, in a scenario in which first UCI and a PUSCH multiplex a resource, a terminal may determine whether received first DCI meets a first condition. If the first condition is met, the terminal may send the first UCI on a symbol multiplexed by the first UCI and the PUSCH, but does not send the PUSCH. This embodiment mainly discusses the foregoing solution 1. The following provides detailed description with reference to FIG. 7.

Figure 7:
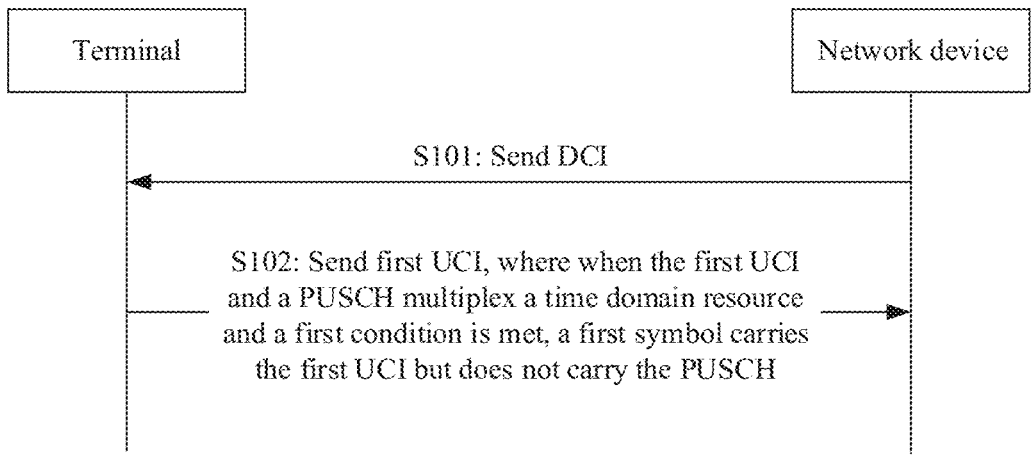
FIG. 7 is a schematic diagram of an example of an uplink control information transmission method according to this application.

FIG. 7 is a schematic flowchart of an uplink control information transmission method according to this application. Details are as follows:

S101: A network device sends first DCI to a terminal. Correspondingly, the terminal receives the first DCI sent by the network device.

S102: The terminal sends first UCI to the network device, where the first UCI is triggered by the first DCI. When the first UCI and a PUSCH multiplex a time domain resource and a first condition is met, a first symbol carries the first UCI but does not carry the PUSCH. The first symbol is a time domain symbol multiplexed by the first UCI and the PUSCH.

In this application, a time domain resource used to transmit the first UCI may be referred to as a first time domain resource. The first symbol may be specifically a time domain symbol on which the first time domain resource overlaps a time domain resource of the PUSCH. In other words, when the first time domain resource partially or completely overlaps the time domain resource of the PUSCH and the first condition is met, the first symbol carries the first UCI but does not carry the PUSCH.

In this embodiment, for how to determine whether the first condition is met, specifically refer to the foregoing content. Details are not described herein again. After determining that the first condition is met, the terminal may provide special protection for the first UCI. Detailed descriptions are as follows.

(1) Prerequisites for providing protection for the first UCI

The first prerequisite is: A resource used to transmit the first UCI partially or completely overlaps a resource used to transmit the PUSCH in time domain.

The second prerequisite is: A resource used to transmit the first UCI partially or completely overlaps a resource used to transmit the PUSCH in time domain, and partially or completely overlaps the resource used to transmit the PUSCH in frequency domain.

The third prerequisite is: A resource used to transmit the first UCI partially or completely overlaps a resource used to transmit the PUSCH in time domain, and does not overlap the resource used to transmit the PUSCH in frequency domain, but a terminal does not have a capability of simultaneously sending a plurality of services in uplink, for example, power of the terminal is limited or the terminal uses an uplink single carrier transmission manner.

It can be learned from the foregoing three prerequisites that a basic prerequisite for providing protection for the first UCI is that the first time domain resource partially or completely overlaps the time domain resource of the PUSCH, in other words, the first UCI and the PUSCH multiplex a time domain resource. The first prerequisite indicates that when the first time domain resource partially or completely overlaps the time domain resource of the PUSCH, if the first condition is met, the terminal may provide special protection for the first UCI, that is, perform S103. The second prerequisite indicates that when the first UCI and the PUSCH multiplex a time-frequency resource, if the first condition is met, the terminal may provide special protection for the first UCI, that is, perform S103. The third prerequisite indicates that when the first UCI and the PUSCH multiplex only a time domain resource (do not multiplex a frequency domain resource), and the terminal does not have the capability of simultaneously sending a plurality of services in uplink, if the first UCI meets the first condition, the terminal may provide special protection for the first UCI, that is, perform S103.

(2) First symbol (time domain resource multiplexed by the first UCI and the PUSCH)

Figure 8:
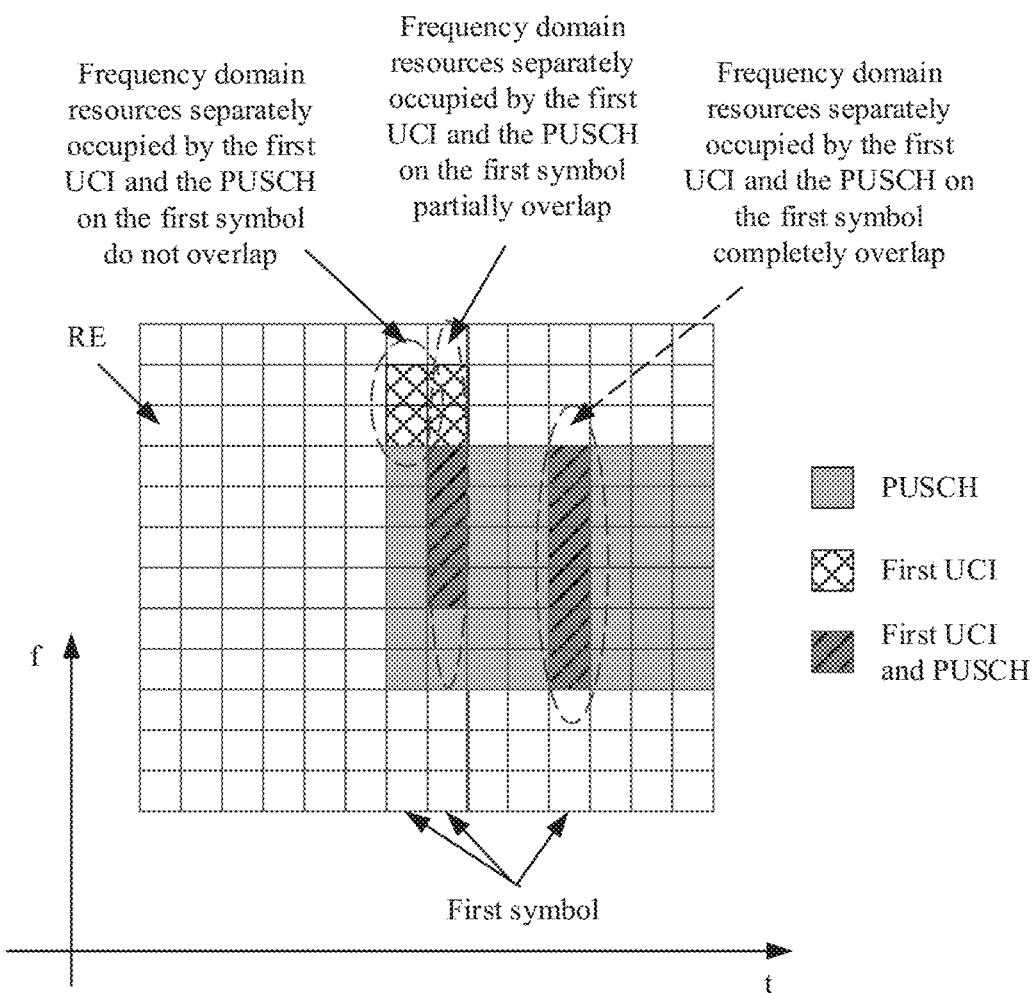
FIG. 8 is a schematic diagram in which URLLC UCI and a PUSCH multiplex a time domain resource.

For example, as shown in FIG. 8, symbols 7, 8, and 11 are used to transmit the URLLC UCI, and symbols 7 to 14 are used to transmit the PUSCH. Symbols that overlap in the symbols 7, 8, and 11 and the symbols 7 to 14 are the symbols 7, 8, and 11, and the symbols 7, 8, and 11 are the first symbol.

Specifically, on the first symbol, frequency domain resource multiplexing of the first UCI and the PUSCH may include the following several cases:

Case 1: Frequency domain resources separately occupied by the first UCI and the PUSCH on the first symbol do not overlap. In other words, the first UCI and the PUSCH each occupy completely different frequency domain resources on the first symbol. For example, referring to FIG. 8, when the first symbol is the symbol 7, frequency domain resources separately occupied by the first UCI and the PUSCH do not overlap.

Case 2: Frequency domain resources separately occupied by the first UCI and the PUSCH on the first symbol partially overlap. In other words, some frequency domain resources in the frequency domain resources separately occupied by the first UCI and the PUSCH on the first symbol are the same. For example, referring to FIG. 8, when the first symbol is the symbol 8, frequency domain resources separately occupied by the first UCI and the PUSCH partially overlap.

Case 3: Frequency domain resources separately occupied by the first UCI and the PUSCH on the first symbol completely overlap. In other words, the frequency domain resources separately occupied by the first UCI and the PUSCH on the first symbol are completely the same. For example, referring to FIG. 8, when the first symbol is the symbol 11, frequency domain resources separately occupied by the first UCI and the PUSCH completely overlap.

(3) The first symbol carries the first UCI but does not carry the PUSCH

Specifically, the terminal may puncture all RBs on the first symbol for the first UCI. In other words, the first symbol is used to transmit only the first UCI but not the PUSCH.

Figure 9:
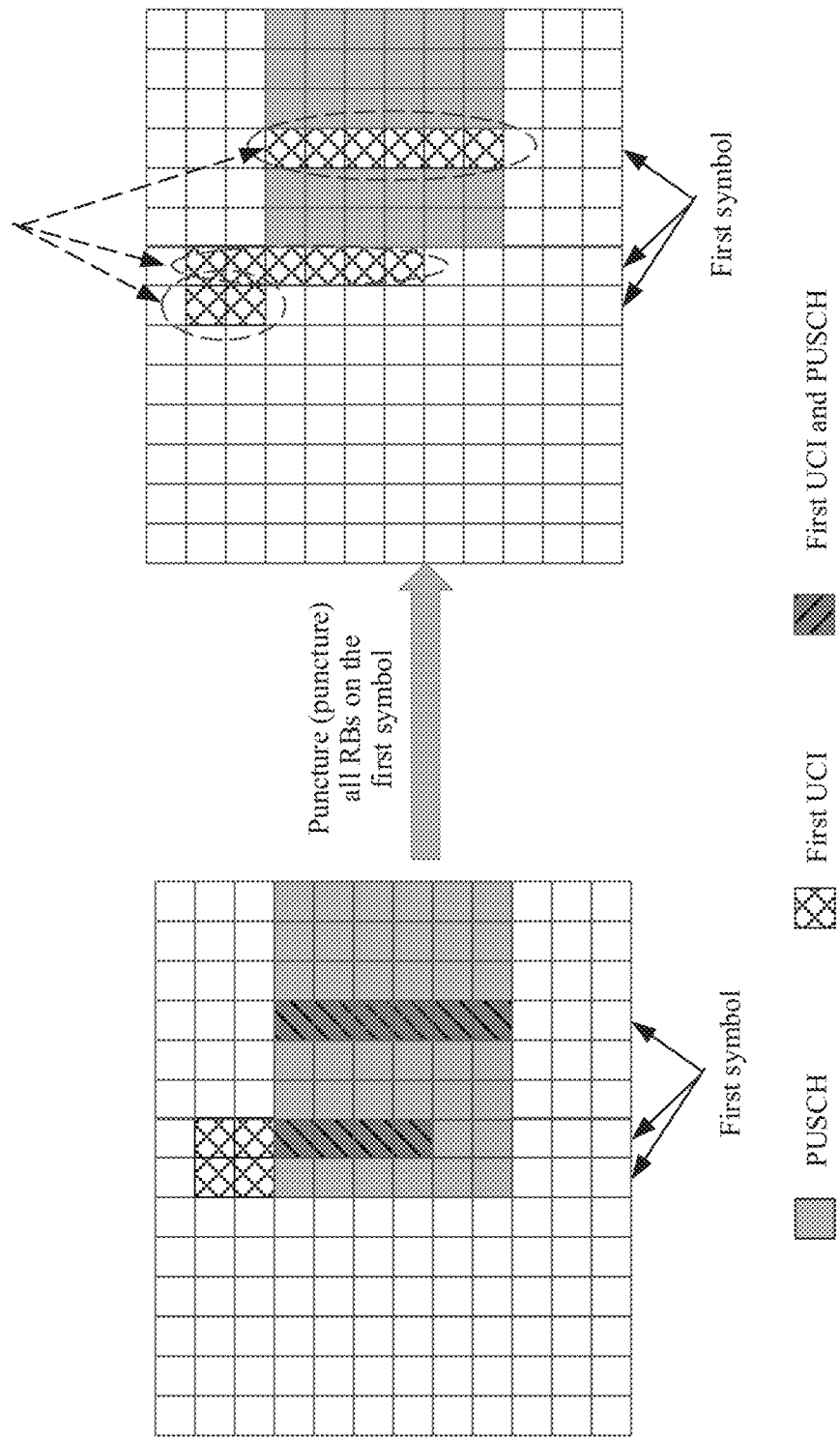
FIG. 9 is a schematic diagram in which URLLC UCI punctures an entire first symbol on a PUSCH.

For example, as shown in FIG. 9, symbols 7, 8, and 11 are used to transmit the URLLC UCI, and symbols 7 to 14 are used to transmit the PUSCH. Symbols that overlap in the symbols 7, 8, and 11 and the symbols 7 to 14 are the symbols 7, 8, and 11, and the symbols 7, 8, and 11 are the first symbol. To provide special protection for the first UCI, the terminal may puncture all RBs on the symbols 7, 8, and 11. In this way, more resources may be allocated to the first UCI, and high reliability of the URLLC service is ensured.

Optionally, the terminal may alternatively set transmit power of the PUSCH on the first symbol to 0. In other words, all transmit power on the first symbol is used to transmit the first UCI. In this way, transmit power of the first UCI may be greatly improved, and reliability of the URLLC service is improved.

It can be learned that the first UCI may be protected in terms of a quantity of resources, in other words, more resources are configured for the first UCI, or the first UCI may be protected in terms of transmit power, in other words, higher transmit power is provided for the first UCI. Both the two manners can improve transmission reliability of the URLLC UCI, and therefore, high reliability of the URLLC service is ensured.

Related Extensions of Embodiment 1

1. In addition to puncturing all RBs on the first symbol, in some optional embodiments, more resources may alternatively be configured for the first UCI in the following manner.

Specifically, the network device may predefine a quantity of frequency domain resources, of the PUSCH, punctured on the first symbol for the first UCI. Optionally, the network device may configure a plurality of options. For example, it is assumed that a size of a frequency domain resource for scheduling on the PUSCH is 10 RBs. The network device configures two options: puncturing two RBs and puncturing five RBs. Optionally, the network device may notify, by using RRC signaling, the terminal of an option to be used. In this way, the terminal may puncture the frequency domain resource of the PUSCH on the first symbol based on the configuration by the network device, so that more resources may be configured for the first UCI.

Specifically, a quantity of physical resources finally mapped by the terminal device may be predefined or may be a quantity of resources, of the PUSCH, punctured on the first symbol for the first UCI that is configured by the network device, or may be a quantity of resources actually required by the first UCI, or may be a quantity of resources occupied by a PUCCH, or may be a smaller value in a quantity of resources actually required by the first UCI and a quantity of resources occupied by the PUCCH.

2. In addition to setting the transmit power of the PUSCH on the first symbol to 0, in some optional embodiments, the transmit power of the first UCI may alternatively be increased in the following manner.

Figure 10:
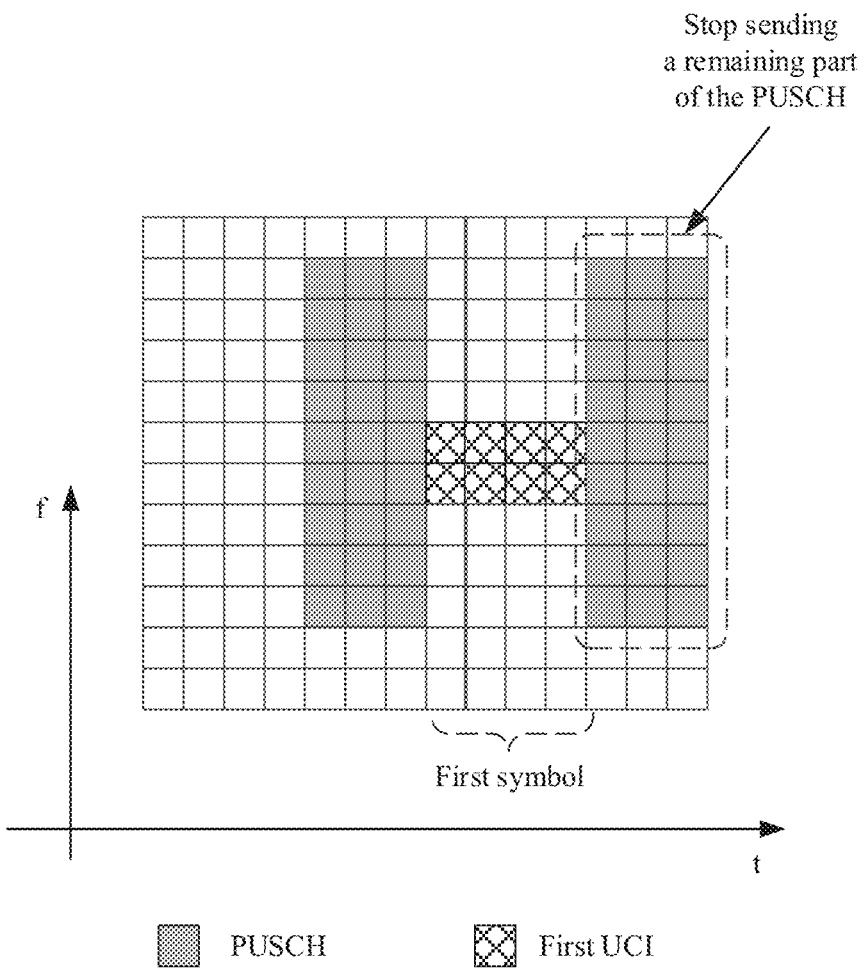
FIG. 10 is a schematic diagram of an example of stopping sending a remaining part of a PUSCH after URLLC UCI is sent.

Specifically, the transmit power of the first UCI may be predefined. Optionally, the transmit power of the first UCI may be predefined as a preset power value. Optionally, the transmit power of the first UCI may be predefined as maximum transmit power of the terminal. Optionally, a power increase multiple of the first UCI may be predefined. In this way, higher transmit power may alternatively be provided for the first UCI, to ensure high reliability of the first UCI. Optionally, the transmit power of the first UCI may be kept consistent with transmit power of the PUSCH on an adjacent symbol. FIG. 10 is used as an example. The adjacent symbol is a time domain symbol that is adjacent to the first symbol and that is used to send the PUSCH. The being predefined herein may be being predefined by a system or a protocol.

3. PUSCH Sending Policy after the First UCI

Specifically, as shown in FIG. 10, to reduce communication complexity between the terminal and the network device, the terminal may stop sending, after sending the first UCI, a remaining part of the PUSCH after the first UCI. A specific policy of stopping sending the PUSCH may be as follows:

Optionally, the network device may configure whether to continue to transmit the remaining part of the PUSCH.

Optionally, if a data volume of the remaining part of the PUSCH is greater than a first threshold, the terminal continues to transmit the remaining part of the PUSCH; if the data volume of the remaining part of the PUSCH is less than or equal to the first threshold, the terminal stops transmitting the remaining part of the PUSCH. The first threshold may be predefined by a protocol, may be predefined by the network device, or may be dynamically configured by the network device based on a sending capability reported by the terminal.

4. The first UCI is carried (piggybacked) on a PUSCH for transmission.

Figure 11A:
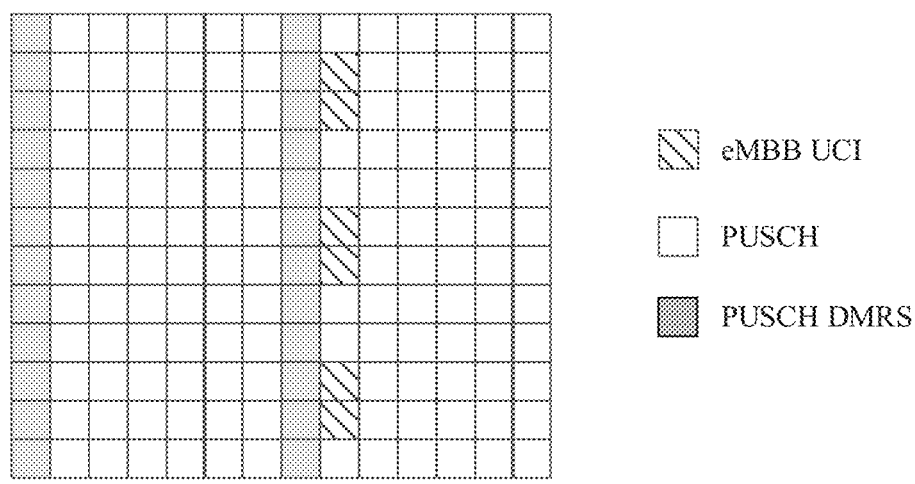
FIG. 11A is a schematic diagram of an example of a resource position of eMBB UCI relative to a PUSCH DMRS.
Figure 11B:
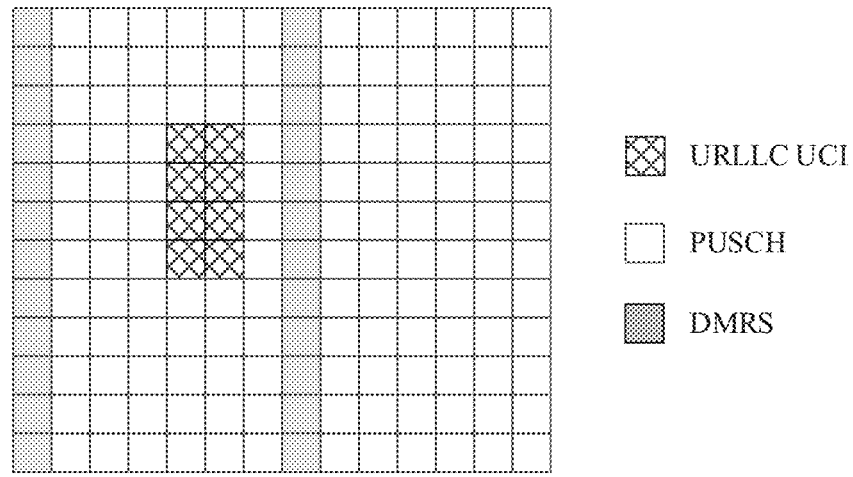
FIG. 11B is a schematic diagram of an example of a resource position of URLLC UCI relative to a PUSCH DMRS according to this application.

Different from that existing UCI is tightly close to a PUSCH DMRS on a time-frequency resource (as shown in FIG. 11A) to improve channel estimation performance, for the first UCI sent after the PUSCH DMRS, as shown in FIG. 11B, the first UCI may be piggybacked on a PUSCH physical resource based on a time sequence requirement of the first UCI.

Herein, the time sequence requirement of the first UCI means that for a received PDSCH, the terminal needs to send the first UCI at a feedback moment of the PDSCH based on the requirement, to meet a latency requirement of the first UCI.

5. For a case in which the first UCI is carried on the PUSCH for transmission, more resources are configured for the first UCI.

For the case in which the first UCI is carried on the PUSCH for transmission, the terminal may use a value of a beta offset field that is predefined for the first UCI by a protocol, or use a value of the beta offset field that is configured for the first UCI by using RRC signaling. The terminal may further use a maximum value of the beta offset field in all predefined values of the beta offset field. In this way, it can be ensured that more resources are allocated to the first UCI, and reliable transmission of the first UCI is ensured.

6. Transmission Priorities of an ACK/a NACK, an RI, and a CQI/PMI

For first UCI of ACK/NACK, RI, and CQI/PMI types, a latency requirement of the ACK/NACK is the highest, and the CQI/PMI needs to be determined by using the RI. Therefore, a relationship among the transmission priorities of the three is: ACK/NACK>RI>CQI/PMI. The greater-than sign indicates a higher priority.

7. A resource collision exists between the first UCI and a DMRS of the PUSCH.

Optionally, if the DMRS of the PUSCH is a comb-shape DMRS used for a CP-OFDM waveform, a URLLC ACK/NACK and the DMRS that is of the PUSCH may multiplex a time domain resource, in other words, may be sent on a same symbol.

Optionally, if the DMRS of the PUSCH is a DMRS used for a DFT-S-OFDM waveform, the URLLC ACK/NACK may skip a symbol used to transmit the DMRS of the PUSCH.

Optionally, if the DMRS of the PUSCH is a DMRS used for the DFT-S-OFDM waveform, and a bit length of the URLLC ACK/NACK is one to two bits, the URLLC ACK/NACK may be mapped to a resource used to transmit the DMRS of the PUSCH. Because a URLLC ACK/NACK sequence of one to two bits does not affect channel estimation, a network side may blindly detect the sequence, and then perform channel estimation.

8. Frequency domain resource to which the first UCI is mapped on a PUSCH.

It is assumed that frequency domain resources/physical resource blocks (PRB)/virtual resource blocks (VRB) occupied by the PUSCH are $m_0, m_1, \ldots,$ and $m_{k-1}$.

Optionally, a start RB of the first UCI may be $m_0$ or $m_{k-1}$.

Optionally, the start RB of the first UCI may alternatively be $m_{\lfloor (k-1)/2 \rfloor}$, $m_{\lceil (k-1)/2 \rceil}$, $m_{\lfloor k/2 \rfloor}$, or $m_{\lceil k/2 \rceil}$.

Optionally, if a quantity of RBs of the first UCI is n, the start RB of the first UCI may alternatively be $m_{\lfloor (k-n)/2 \rfloor}$ or $m_{\lceil (k-n)/2 \rceil}$.

It may be understood that, signal quality at an edge (to be specific, near frequencies of two ends of filter bandwidth) of a filter used to process a sent signal may be lost. By setting the start RB of the first UCI at a middle frequency domain position of the PUSCH, impact of the filter on performance of the UCI can be reduced. In addition, by setting the start RB of the first UCI at the middle frequency domain position of the PUSCH, interference of a neighboring frequency domain on the UCI may be reduced.

Optionally, the frequency domain resource to which the first UCI is mapped on the PUSCH may be a segment of consecutive frequency domain resource blocks.

9. Numerology used by the first UCI

Optionally, when a time sequence requirement of the URLLC UCI can be met, a subcarrier spacing (SCS) of the first UCI may be a subcarrier spacing of the PUSCH. In this way, frequency-domain interference between the first UCI and the PUSCH may be reduced. Optionally, a relatively long cyclic prefix (CP) may be further used by the first UCI, to further reduce frequency-domain interference.

Optionally, when a time sequence requirement of the URLLC UCI cannot be met, the subcarrier spacing (SCS) of the first UCI may be a subcarrier spacing of the URLLC PUCCH, to reduce a latency.

Herein, the time sequence requirement of the URLLC UCI means that for a received PDSCH, the terminal needs to send the URLLC UCI at a feedback moment of the PDSCH based on the requirement, to meet a latency requirement of the first UCI.

(2) Embodiment 2

In this embodiment, in a scenario in which first UCI and second UCI multiplex a resource, a terminal may determine whether received first DCI meets a first condition. If the first condition is met, the terminal may provide more protection for the first UCI. Specifically, the first UCI may be transmitted first, or a coding scheme with higher reliability may be set for the first UCI. This embodiment mainly discusses the foregoing solutions 2 and 3. The following provides detailed description with reference to FIG. 12.

Figure 12:
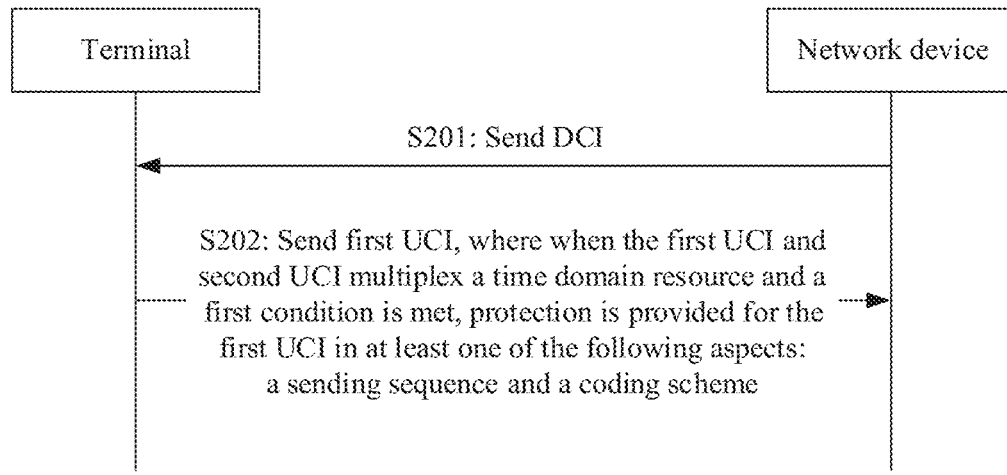
FIG. 12 is a schematic diagram of an example of another uplink control information transmission method according to this application.
Figure 13A:
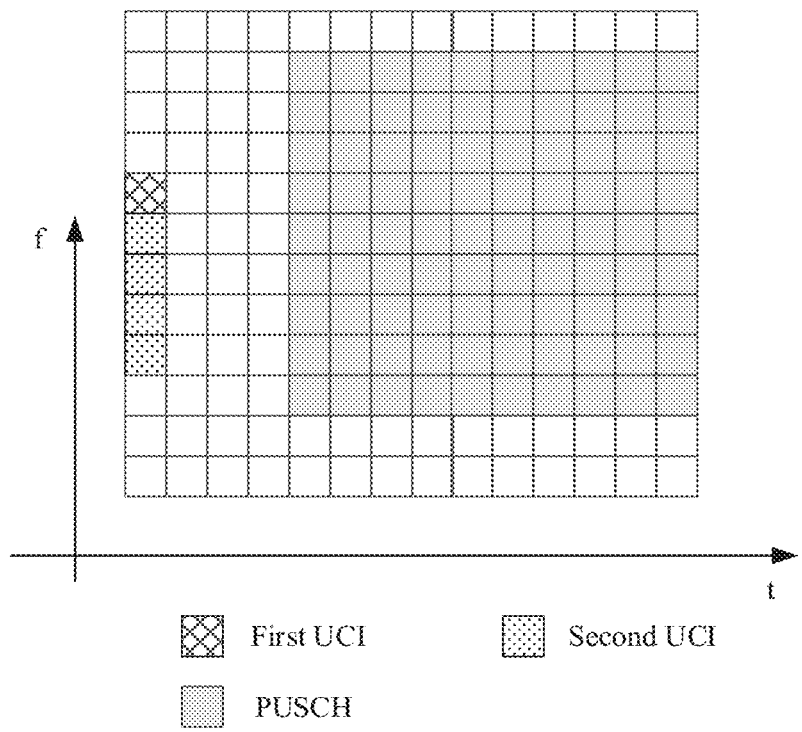
FIG. 13A is a schematic diagram of an example in which a resource used to transmit first UCI completely overlaps a resource used to transmit second UCI in time domain.
Figure 13B:
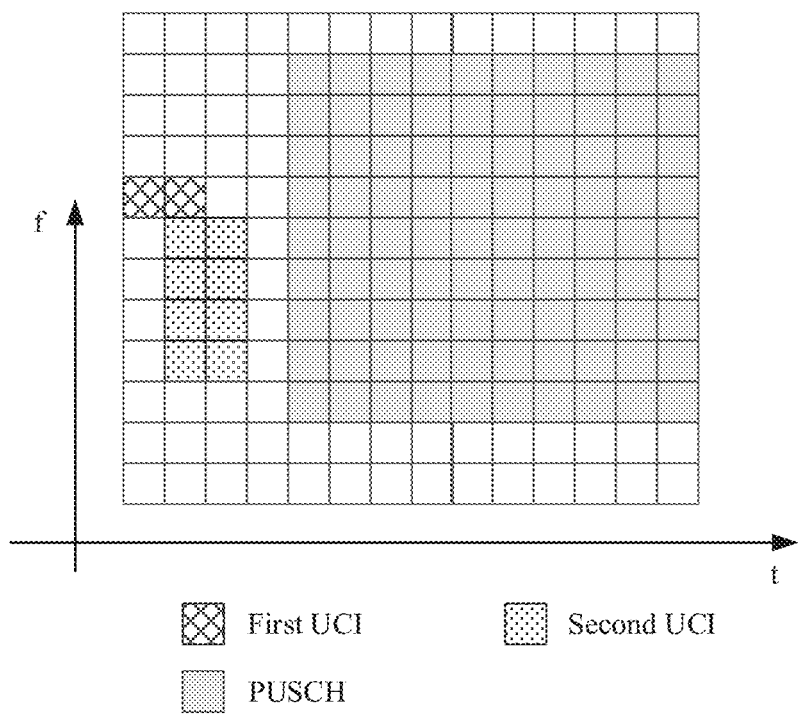
FIG. 13B is a schematic diagram of an example in which a resource used to transmit first UCI partially overlaps a resource used to transmit second UCI in time domain.

FIG. 12 is a schematic flowchart of another uplink control information transmission method according to this application. Details are as follows:

S201: A network device sends first DCI to a terminal. Correspondingly, the terminal receives the first DCI sent by the network device.

S202: The terminal sends first UCI to the network device, where the first UCI is triggered by the first DCI. When the first UCI and the second UCI multiplex a time domain resource, and a first condition is met, protection may be provided for the first UCI in at least one of the following aspects: a sending sequence and a coding scheme, where the first UCI is sent before the second UCI, and a first coding scheme used for the first UCI has higher data transmission reliability than a second coding scheme used for the second UCI.

In this application, a time domain resource used to transmit the first UCI may be referred to as a first time domain resource, and a time domain resource used to transmit the second UCI may be referred to as a second time domain resource. Herein, that the first UCI and the second UCI multiplex a time domain resource means that the first time domain resource and the second time domain resource partially or completely overlap. Herein, that the first UCI is sent before the second UCI means that an end time domain symbol carrying the first UCI is earlier than a start time domain symbol carrying the second UCI.

In this embodiment, for how to determine whether the first DCI received by the terminal meets the first condition, refer to the foregoing content. Details are not described herein again. After determining that the first DCI received by the terminal meets the first condition, the terminal may provide special protection for the UCI (to be specific, the first UCI) corresponding to the DCI. Detailed descriptions are as follows.

(1) Prerequisites for providing protection for the first UCI

The first prerequisite is: A resource used to transmit the first UCI partially or completely overlaps a resource used to transmit the second UCI in time domain.

The second prerequisite is: A resource used to transmit the first UCI partially or completely overlaps a resource used to transmit the second UCI in time domain, and partially or completely overlaps the resource used to transmit the second UCI in frequency domain.

The third prerequisite is: A resource used to transmit the first UCI partially or completely overlaps a resource used to transmit the second UCI in time domain, and does not overlap the resource used to transmit the second UCI in frequency domain, but a terminal does not have a capability of simultaneously sending a plurality of services in uplink, for example, power of the terminal is limited or the terminal uses an uplink single carrier transmission manner.

It can be learned from the foregoing three prerequisites that a basic prerequisite for providing protection for the first UCI is that the first time domain resource partially or completely overlaps the second time domain resource, in other words, the first UCI and the second UCI multiplex a time domain resource. The first prerequisite indicates that when the first UCI and the second UCI multiplex a time domain resource, if the first UCI meets the first condition, the terminal may provide special protection for the first UCI, that is, perform S203. The second prerequisite indicates that when the first UCI and the second UCI multiplex a time-frequency resource, if the first UCI meets the first condition, the terminal may provide special protection for the first UCI, that is, perform S203. The third prerequisite indicates that when the first UCI and the second UCI multiplex only a time domain resource (do not multiplex a frequency domain resource), and the terminal does not have the capability of simultaneously sending a plurality of services in uplink, if the first UCI meets the first condition, the terminal may provide special protection for the first UCI, that is, perform S203.

(2) The end time domain symbol carrying the first UCI is earlier than the start time domain symbol carrying the second UCI Specifically, when the first time domain resource partially or completely overlaps the second time domain resource, the end time domain symbol carrying the first UCI is earlier than the start time domain symbol carrying the second UCI. In other words, sending of the second UCI may be delayed, the first UCI is sent first, and then the second UCI is sent. In this way, it is ensured that the first UCI having a high reliability requirement is first sent, and then the second UCI is sent, so that reliability of a URLLC service is ensured.

Figure 14A:
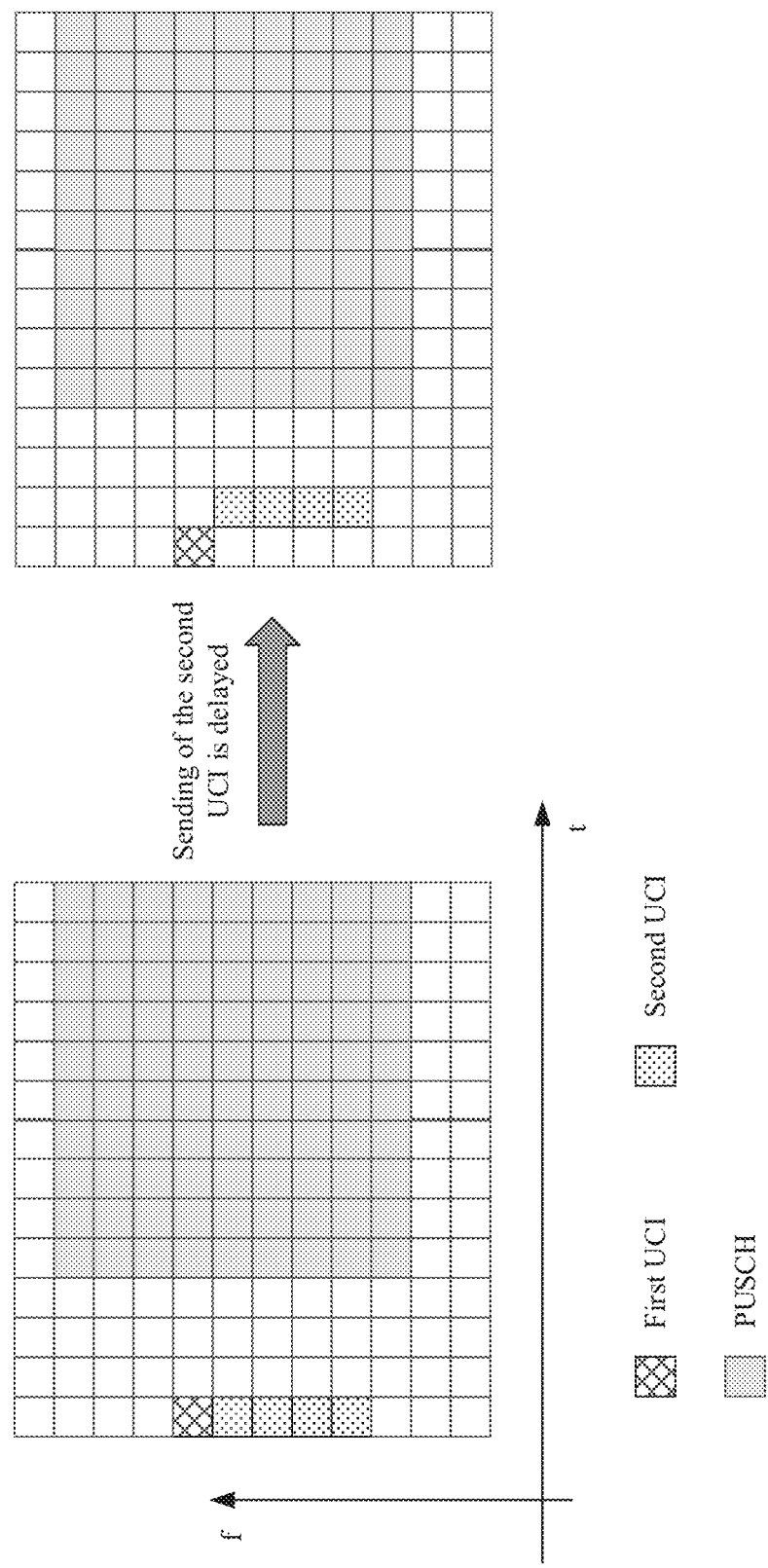
FIG. 14A is a schematic diagram of an example of a case in which sending of second UCI is delayed.

For example, as shown in FIG. 14A, a symbol used to transmit the first UCI is a symbol 1, a symbol used to transmit the second UCI is also the symbol 1, and the second UCI may be delayed to a symbol 2 for sending. In other words, an end time domain symbol (namely, the symbol 1) carrying the first UCI is earlier than a start time domain symbol (namely, the symbol 2) carrying the second UCI.

Figure 14B:
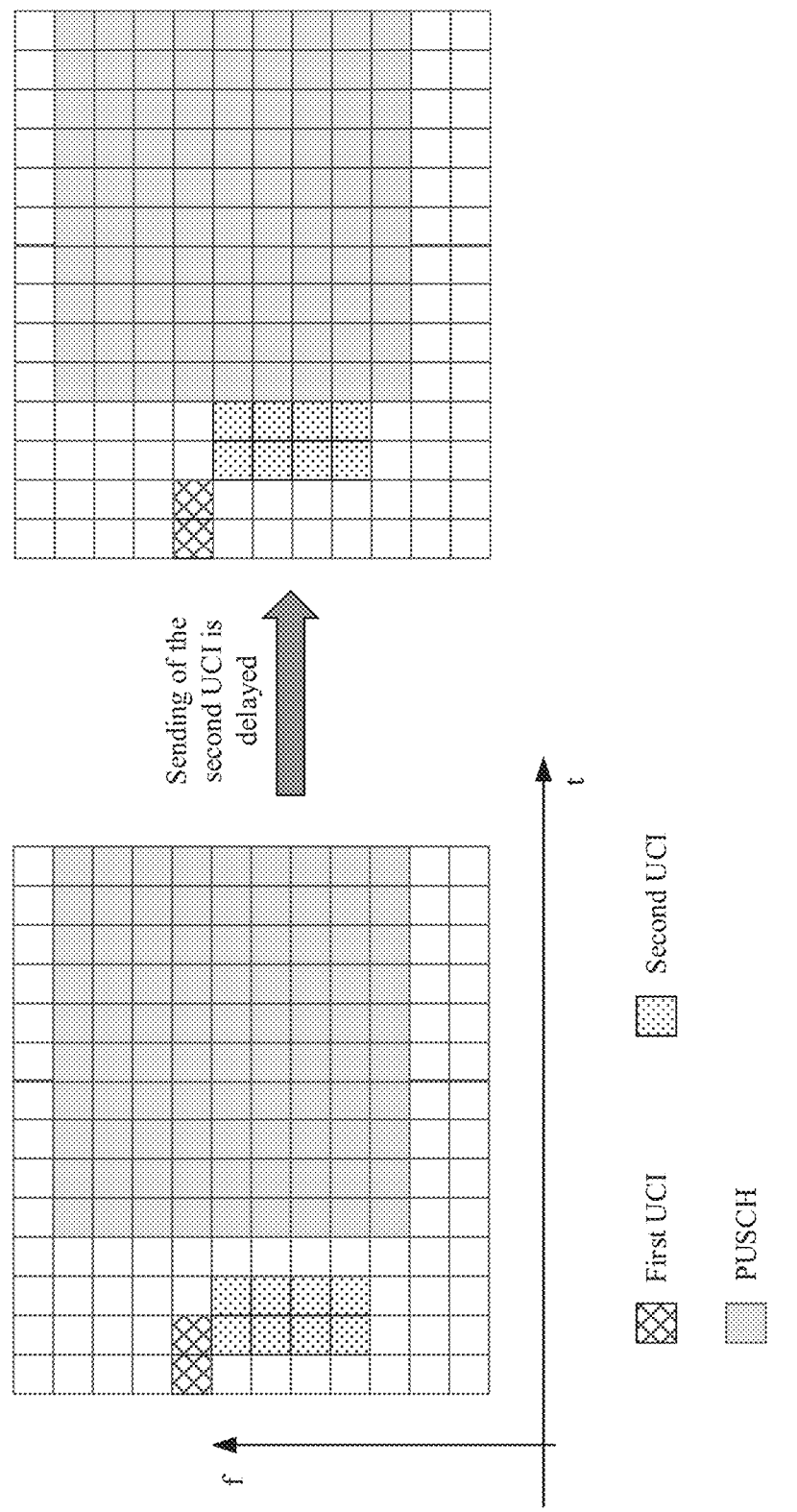
FIG. 14B is a schematic diagram of an example of another case in which sending of second UCI is delayed.

For another example, as shown in FIG. 14B, symbols used to transmit the first UCI is a symbol 1 and a symbol 2, symbols used to transmit the second UCI is the symbol 2 and a symbol 3, and the second UCI may be delayed to the symbol 3 and a symbol 4 for sending. In other words, an end time domain symbol (namely, the symbol 2) carrying the first UCI is earlier than a start time domain symbol (namely, the symbol 3) carrying the second UCI.

The examples are only used to explain this application and shall not constitute a limitation.

Further, the terminal may perform HARQ-ACK bits bundling on the second UCI whose sending is delayed. In this way, a feedback latency of the second UCI may be reduced.

Optionally, the terminal may specifically determine, based on a symbol resource on which the delayed UCI is sent, whether to perform HARQ-ACK bits bundling on the delayed second UCI. If the symbol resource is insufficient to transmit the second UCI in a HARQ-ACK bits multiplexing manner, the terminal may determine to perform HARQ-ACK bits bundling on the second UCI whose sending is delayed.

(3) The first UCI is encoded by using the first coding scheme

Specifically, the first coding scheme used for the first UCI has higher data transmission reliability than the second coding scheme used for the second UCI. The first coding scheme is different from the second coding scheme. A difference between the first coding scheme and the second coding scheme lies in but is not limited to: A quantity of bits of the first UCI may be increased after the first UCI is encoded by using the first coding scheme, and/or a quantity of bits of the second UCI is decreased after the second UCI is encoded by using the second coding scheme. Details are as follows:

1. Different redundancy

The first coding scheme may include: performing redundancy coding on the first UCI. To be specific, the terminal may first add redundancy to a source of the first UCI and then perform encoding, or may first perform encoding and then perform bit-plus redundancy on first UCI obtained after encoding.

In this way, the quantity of bits of the first UCI may be increased after the first UCI is encoded, so that the first UCI has a higher error correction capability than the second UCI, and high reliability of the URLLC service is ensured.

Figure 15A:
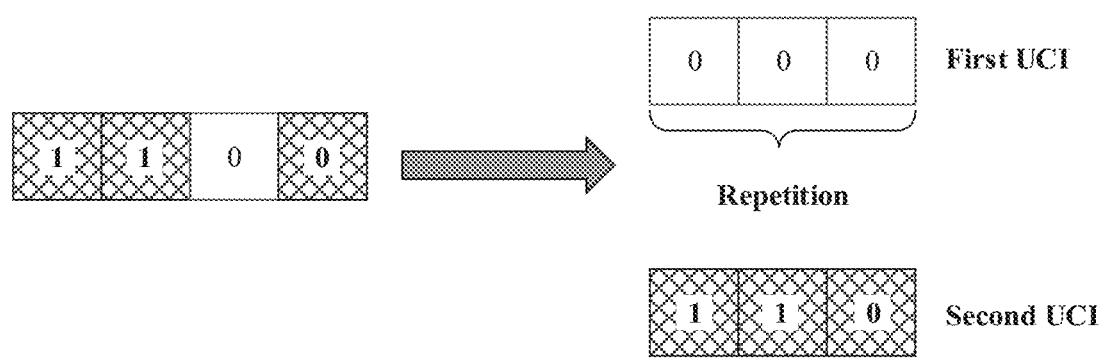
FIG. 15A is a schematic diagram of an example in which coding schemes of different redundancy are used for first UCI and second UCI.

For example, FIG. 15A shows four bits that are continuously fed back, where the first, the second, and the fourth bits are the second UCI, and the third bit is the first UCI. Repetitive coding is performed on the first UCI, and a sequence length of the first UCI increases from one bit to three bits, so that redundancy increases, and reliability also increases. The example is only used to explain this application and shall not constitute a limitation.

The second coding scheme may include: performing HARQ-ACK bits bundling on the second UCI. In this way, the quantity of bits of the second UCI may be decreased after the second UCI is encoded.

Figure 15B:
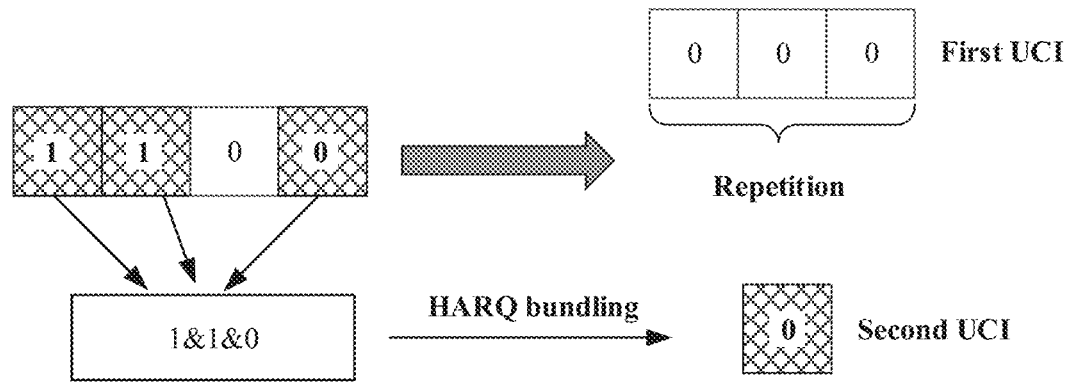
FIG. 15B is a schematic diagram of an example of performing HARQ-ACK bits bundling on second UCI in the example in FIG. 15A.

Optionally, redundancy coding may be performed on the first UCI, and HARQ-ACK bits bundling may be performed on the second UCI. In this way, not only transmission reliability of the first UCI may be improved, but also resources required for jointly feeding back the first UCI and the second UCI may be reduced. For example, as shown in FIG. 15B, a sequence length of the second UCI is shortened from three bits to one bit through HARQ-ACK bits bundling. Even if the first UCI is increased to three bits after redundancy processing, a data length jointly fed back by the first UCI and the second UCI remains unchanged. HARQ-ACK bits bundling of the second UCI may be bundling performed on HARQ-ACK bits corresponding to different CBGs (code block group), or bundling performed on HARQ-ACK bits corresponding to different TBs (Transport block), or bundling performed on HARQ-ACK bits corresponding to different component carriers or bandwidth parts.

2. Different code distances

In an implementation, high reliability of the URLLC may be ensured through coding setting.

A URLLC ACK/NACK and an eMBB ACK/NACK are used as an example. It is assumed that the terminal currently needs to feed back the URLLC ACK/NACK and the eMBB ACK/NACK. There are two bits in total, the first bit is the URLLC ACK/NACK, and the second bit is the eMBB ACK/NACK. The two bits have four states: "00", "01", "10", and "11". "0" represents a NACK, and "1" represents an "ACK". To ensure high reliability of the URLLC, a probability that "0" in the first bit is incorrectly detected as "1" or "1" is incorrectly detected as "0" needs to be reduced. Specifically, the terminal may set a larger code distance for "00" and "10", "00" and "11", "01" and "11", and "01" and "10". However, eMBB has a low reliability requirement. Therefore, a small code distance may be set for "00" and "01", and for "10" and "11".

Figures 16A, 16B:
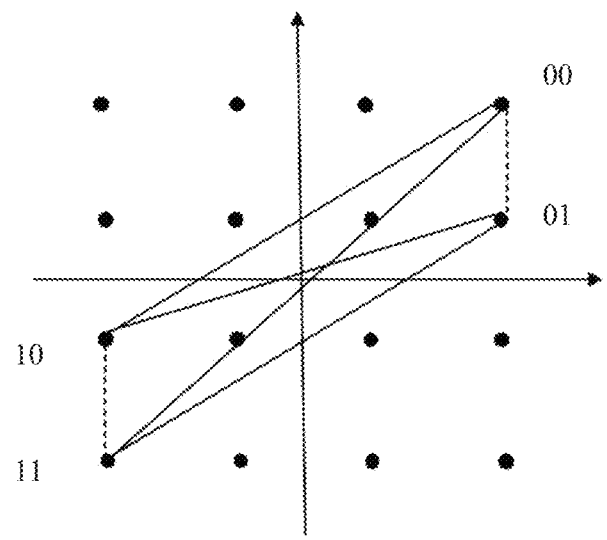
FIG. 16A is a schematic diagram of an example of a manner in which different code distances are used for first UCI and second UCI.
FIG. 16B is a schematic diagram of an example of another manner in which different code distances are used for first UCI and second UCI.

As shown in FIG. 16A, "00", "01", "10", and "11" may be encoded. After encoding, "00" is changed to "00000000", "01" is changed to "00000001", "10" is changed to "11111110", and "11" is changed to "11111111". In other words, a code distance between "00" and "10" is 7, a code distance between "00" and "11" is 8, a code distance between "01" and "11" is 7, and a code distance between "01" and "10" is 7. It may be understood that, for "00000000" and "11111110" between which a code distance is 7, a URLLC ACK and a URLLC NACK are not easily confused. In this way, even if one or some of the first seven bits are inverted in a transmission process, a receive end can still correctly determine whether the URLLC UCI is an ACK or a NACK, so that reliability of the URLLC may be better ensured.

In another implementation, mapping of "00", "01", "10", and "11" to a constellation diagram is correspondingly shown. A longer distance in the constellation diagram indicates higher reliability.

For example, as shown in FIG. 16B, for the two-bit URLLC ACK/NACK and the two-bit eMBB ACK/NACK in the foregoing example, a distance between a mapping location of "00" in the constellation diagram and a mapping location of "10" in the constellation diagram may be extended, a distance between a mapping location of "00" in the constellation diagram and a mapping location of "11" in the constellation diagram may be extended, a distance between a mapping location of "01" in the constellation diagram and a mapping location of "10" in the constellation diagram may be extended, and a distance between a mapping location of "01" in the constellation diagram and a mapping location of "11" in the constellation diagram may be extended.

It may be understood that a probability of incorrectly detecting the first UCI may be reduced by distinctively setting code distances, so that the first UCI has a higher error correction capability than the second UCI, and high reliability of the URLLC service is ensured.

Related Extensions of Embodiment 2

In addition to the foregoing (2) and (3), in some optional embodiments, the terminal may alternatively provide more protection for the first UCI in the following manners:

1. Configure more resources for the first UCI

Specifically, the terminal may use a value of a beta offset field that is predefined for the first UCI by a protocol, or use a value of the beta offset field that is configured for the first UCI by using RRC signaling. The terminal may further use a maximum value of the beta offset field in all predefined values of the beta offset field. In this way, it can be ensured that more resources are allocated to the first UCI, and reliable transmission of the first UCI is ensured.

Figure 17:
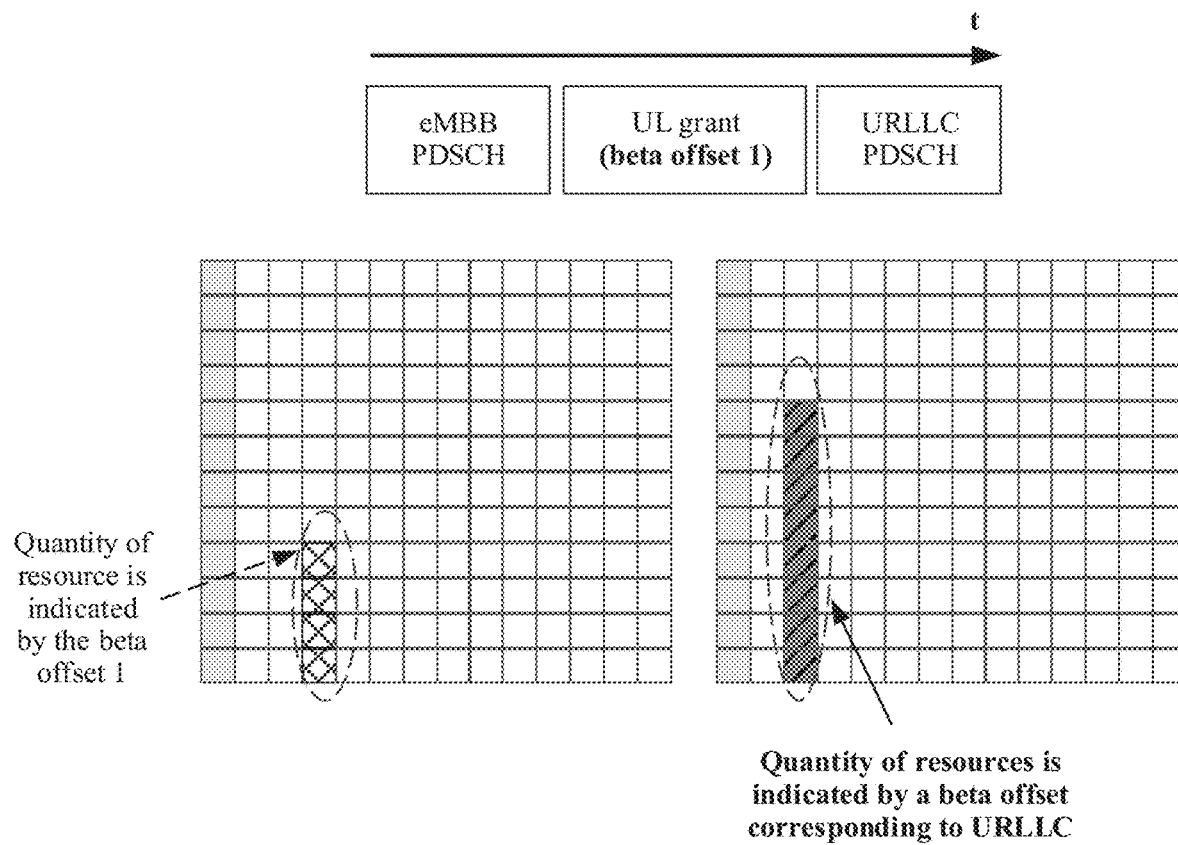
FIG. 17 is a schematic diagram in which a quantity of resources occupied by first UCI is indicated by a beta offset corresponding to URLLC.

The foregoing manner is also applicable to the case shown in FIG. 3. As shown in FIG. 17, for a URLLC service that bursts after a UL grant, although a quantity of REs occupied by URLLC UCI is not indicated in DCI (which is specifically a beta offset in the DCI) used for sending the UL grant, the terminal may use a value of the beta offset field that is predefined for the URLLC UCI by a protocol, to ensure that the URLLC UCI obtains more resources, and better ensure high reliability of the URLLC.

The foregoing manner may also be applicable to a scenario in which URLLC UCI is separately sent. In FIG. 17, the URLLC UCI is separately transmitted, and does not multiplex a time domain resource with eMBB UCI.

2. Different bit rates

Specifically, a bit rate of the first UCI is lower than a bit rate of the second UCI. The terminal may use a bit rate of the first UCI that is predefined by a protocol or configured by using RRC signaling, to better ensure a low bit rate of the first UCI and ensure high reliability of the URLLC service.

3. Configure higher transmit power for the first UCI

Specifically, the network device may predefine transmit power of the first UCI. Optionally, the network device may predefine the transmit power of the first UCI as a preset power value. Optionally, the network device may predefine the transmit power of the first UCI as maximum transmit power of the terminal. Optionally, the network device may predefine a power increase multiple of the first UCI.

Figure 18:
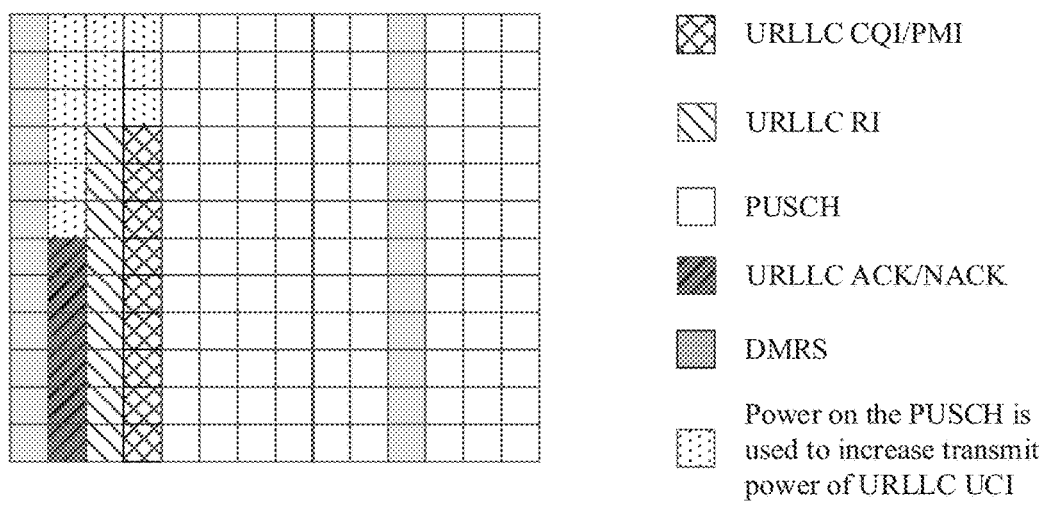
FIG. 18 is a schematic diagram in which power on a PUSCH is used to increase transmit power of URLLC UCI.

For example, as shown in FIG. 18, symbols 2 to 4 are the first symbol. A URLLC ACK/NACK and an eMBB PUCCH multiplex the symbol 2, a URLLC RI and the eMBB PUCCH multiplex the symbol 3, and a URLLC CQI/PMI and the eMBB PUCCH multiplex the symbol 4. The network device may configure transmit power of first UCI (the ACK/NACK, the RI, and the CQI/PMI) on the symbols 2 to 4 as a preset power value, or may configure a power increase multiple (to be specific, the transmit power of the first UCI increases, and transmit power of the eMBB PUCCH decreases) of the first UCI on the symbols 2 to 4. In an extreme case, the transmit power of the eMBB PUCCH may be set to o, in other words, all power on the symbols 2 to 4 is used to transmit the first UCI. In this way, higher transmit power may be provided for the first UCI, and high reliability of the URLLC UCI is ensured.

In addition, this application further provides an uplink control information transmission method. Different from descriptions in the foregoing embodiments that the terminal implicitly or explicitly determines, based on the received first DCI, that the UCI (namely, the UCI triggered by the first DCI) corresponding to the first DCI needs to be protected, in this embodiment, the terminal may determine, based on a feature of the UCI, whether special protection is required for transmission of the UCI. This embodiment is not limited to the URLLC UCI or the eMBB UCI.

In this embodiment, the following two determining manners are provided.

In a determining manner 1, whether UCI currently sent by the terminal needs special protection is determined based on whether the terminal is in a coordinating cluster, and if the terminal is in the coordinating cluster, it is determined that the UCI needs special protection.

It may be understood that, to further assist downlink coordinated sending performance and ensure that each transmission point (TRP) can receive UCI sent by the terminal, special protection needs to be provided for the UCI. For how to provide protection for the UCI, refer to the solution of providing protection for the first UCI described in the foregoing embodiments. Details are not described herein again.

In a determining manner 2, whether UCI currently sent by the terminal needs special protection is determined based on a quantity of symbols of a PUCCH or an SCS, and if the quantity of symbols of the PUCCH is relatively small or the SCS is relatively large, it is determined that the UCI needs special protection.

It may be understood that a relatively small quantity of symbols or a relatively large SCS reduces coverage performance of the PUCCH. To ensure reliable transmission of the UCI, special protection needs to be provided for the UCI. For how to provide protection for the UCI, refer to the solution of providing protection for the first UCI described in the foregoing embodiments. Details are not described herein again.

Specifically, when the quantity of symbols of the PUCCH is less than a first threshold, it may be determined that special protection needs to be provided for the UCI. When the SCS is greater than a second threshold, it may be determined that special protection needs to be provided for the UCI. The first threshold or the second threshold may be predefined by a protocol or configured by using RRC signaling.

It may be understood that the foregoing solution may be extended to a carrier aggregation scenario, in other words, the foregoing solution is also applicable to feedback of HARQ-ACK bits or SRs or CSI corresponding to different carriers CCs or bandwidth parts.

In addition, this application further provides a method for determining whether an SR needs to be protected. Specifically, the method may include but is not limited to the following two manners:

Manner 1: Which services are URLLC services is configured by using RRC signaling or is predefined by a protocol. When delivering an SR, a MAC layer of a terminal adds a label or an attribute to the SR, to identify whether the SR is a URLLC SR that needs special protection.

In Manner 1, a network device configures or a protocol predefines that some services (represented by a logical channel or a QCI (QoS class identifier)) are URLLC services. When receiving URLLC uplink data and generates the SR, the MAC layer of the terminal indicates, to a physical layer of the terminal, that the SR is a URLLC SR.

Manner 2: A plurality of sets of SR configurations (where the configurations may include a time domain resource, a frequency domain resource, a time-frequency resource, or the like) are configured by RRC signaling, and one (or some) of the plurality of sets of configurations is used to transmit a URLLC SR. When a MAC layer of a terminal delivers an SR, a set of configurations to which the SR belongs is indicated.

In Manner 2, a network device configures a plurality of sets of SR configurations, and one (or some) of the plurality of sets of SR configurations is used to transmit a URLLC SR. When delivering a URLLC SR to a physical layer of the terminal, the MAC layer of the terminal uses SR configurations corresponding to the URLLC SR.

With reference to Manner 1 or Manner 2, after it is determined that an SR needs to be protected, special protection may be provided for the SR according to the solution provided in the foregoing embodiments. Details are not described herein again.

Figure 19:
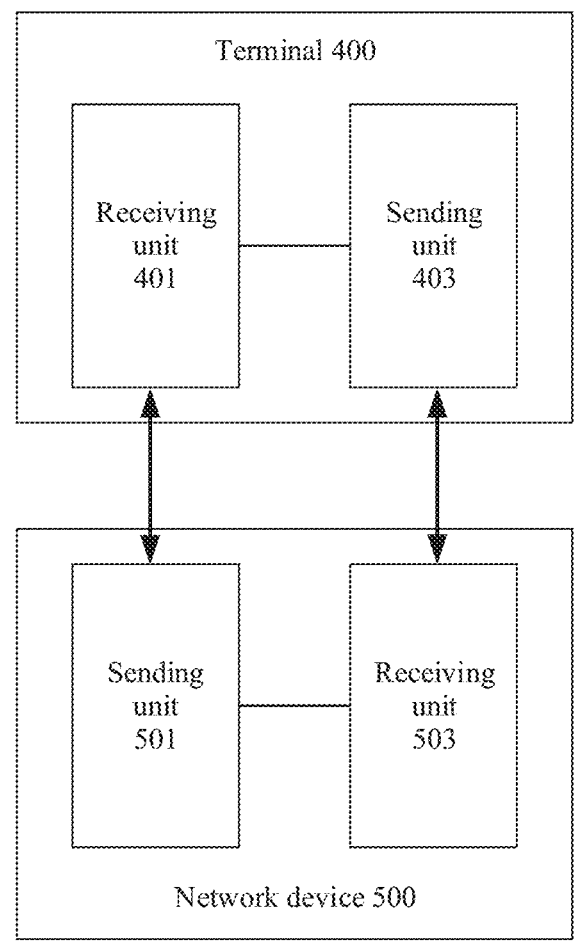
FIG. 19 is a function block diagram of a wireless communications system, a terminal, and a network device according to this application.

FIG. 19 shows a wireless communications system and a related communications apparatus according to this application. The wireless communications system 10 includes a terminal 400 and a network device 500. The wireless communications system 10 may be the wireless communications system 100 shown in FIG. 1. The terminal 400 may be the terminal device 103 in the wireless communications system 100 shown in FIG. 1. The network device 500 may be the network device 101 in the wireless communications system 100 shown in FIG. 1. The following separately describes functional units included in each of the terminal 400 and the network device 500.

As shown in FIG. 19, the terminal 400 may include a receiving unit 401 and a sending unit 403.

The receiving unit 401 may be configured to receive first DCI.

The sending unit 403 may be configured to send first UCI, where the first UCI is triggered by the first DCI.

Optionally, physical hardware corresponding to the receiving unit 401 may be a receiver. Physical hardware corresponding to the sending unit 403 may be a transmitter. The terminal 400 may further include a memory, configured to store a program and/or data executed by a processor.

As shown in FIG. 19, the network device 500 may include a sending unit 501 and a receiving unit 503.

The sending unit 501 may be configured to send first DCI.

The receiving unit 503 may be configured to receive first UCI, where the first UCI is triggered by the first DCI.

Optionally, physical hardware corresponding to the receiving unit 502 may be a receiver. Physical hardware corresponding to the sending unit 501 may be a transmitter. The network device 500 may further include a memory, configured to store a program and/or data executed by a processor.

In some optional embodiments, when a first time domain resource partially or completely overlaps a time domain resource of an uplink data channel and a first condition is met, a first symbol carries the first UCI but does not carry the uplink data channel. The first symbol is a time domain symbol on which the first time domain resource overlaps the time domain resource of the uplink data channel. The first time domain resource is used to transmit the first UCI. Specifically, refer to the embodiment of FIG. 7, and details are not described herein again.

In some optional embodiments, when a first time domain resource partially or completely overlaps a second time domain resource and a first condition is met, an end time domain symbol carrying the first UCI is earlier than a start time domain symbol carrying second UCI. The first time domain resource is used to transmit the first UCI, and the second time domain resource is used to transmit the second UCI. Specifically, refer to the embodiment of FIG. 12, and details are not described herein again.

In some optional embodiments, when a first time domain resource partially or completely overlaps a second time domain resource and a first condition is met, a first coding scheme used for the first UCI has higher data transmission reliability than a second coding scheme used for second UCI. The first time domain resource is used to transmit the first UCI, and the second time domain resource is used to transmit the second UCI. Specifically, refer to the embodiment of FIG. 12, and details are not described herein again.

It may be understood that for specific implementation of functional units included in the terminal 400 and specific implementation of functional units included in the network device 500, refer to the embodiment of FIG. 7 or FIG. 12. Details are not described herein again.

It may be understood that, when the embodiments of this application are applied to a network device chip, the network device chip implements a function of the network device in the foregoing method embodiments. The network device chip sends the first DCI to another module (for example, a radio frequency module or an antenna) in the network device, or receives the first UCI from the another module (for example, the radio frequency module or the antenna) in the network device. The first DCI is sent to the terminal by using the another module in the network device. The first UCI is sent by the terminal to the network device.

When the embodiments of this application are applied to a terminal chip, the terminal chip implements a function of the terminal in the foregoing method embodiments. The terminal chip receives the first DCI from another module (for example, a radio frequency module or an antenna) in the terminal, or sends the first UCI by using the another module (for example, the radio frequency module or the antenna) in the terminal. The first UCI is sent to the network device by using the another module in the terminal. The first DCI is sent by the network device to the terminal.

In conclusion, according to the technical solutions provided in this application, special protection may be provided for the URLLC UCI in terms of a transmission resource, a coding scheme, a sending sequence, and the like, to better ensure high reliability of the URLLC service.

A person of ordinary skill in the art may understand that all or some of the processes of the methods in the embodiments may be implemented by a computer program instructing relevant hardware. The program may be stored in a computer-readable storage medium. When the program is executed, the processes of the methods in the embodiments are performed. The foregoing storage medium includes: any medium that can store program code, such as a ROM, a random access memory RAM, a magnetic disk, or an optical disc.

What is claimed is:
1. A method, comprising:
receiving first downlink control information (DCI) triggering transmission of a first uplink control information (UCI); and
sending the first UCI in a first time domain resource on a physical uplink control channel (PUCCH), wherein, when the first time domain resource partially or completely overlaps a time domain resource of a physical uplink shared channel (PUSCH), and when a payload size of the first DCI is equal to a first value configured by radio resource control (RRC) signaling and a value of a DCI format identification field in the first DCI is equal to a second value configured by the RRC signaling, the first time domain resource comprises a first symbol that carries the first UCI but does not carry the PUSCH, the first symbol being a time domain symbol overlapping the time domain resource of the PUSCH.

2. The method according to claim 1, wherein the first UCI comprises a hybrid automatic repeat request (HARQ) acknowledgment/negative acknowledgment (ACK/NACK) corresponding to a downlink data packet on a physical downlink shared channel (PDSCH).

3. The method according to claim 1, further comprising:
stopping sending a remaining part of the PUSCH whose time domain position is after the first symbol.

4. An apparatus, comprising:
a non-transitory memory storage comprising instructions; and
one or more processors in communication with the memory storage, wherein the instructions, when executed by the one or more processors, cause the apparatus to:
receive first downlink control information (DCI) triggering transmission of a first uplink control information (UCI); and
send the first UCI in a first time domain resource on a physical uplink control channel (PUCCH), wherein, when the first time domain resource partially or completely overlaps a time domain resource of a physical uplink shared channel (PUSCH), and when a payload size of the first DCI is equal to a first value configured by radio resource control (RRC) signaling and a value of a DCI format identification field in the first DCI is equal to a second value configured by the RRC signaling, the first time domain resource comprises a first symbol that carries the first UCI but does not carry the PUSCH, the first symbol being a time domain symbol overlapping the time domain resource of the PUSCH.

5. The apparatus according to claim 4, wherein the first UCI comprises a hybrid automatic repeat request (HARQ) acknowledgment/negative acknowledgment (ACK/NACK) corresponding to a downlink data packet on a physical downlink shared channel (PDSCH).

6. The apparatus according to claim 4, wherein the instructions, when executed by the one or more processors, cause the apparatus further to:
stop sending a remaining part of the PUSCH whose time domain position is after the first symbol.

7. An apparatus, comprising:
a non-transitory memory storage comprising instructions; and
one or more processors in communication with the memory storage, wherein the instructions, when executed by the one or more processors, cause the apparatus to:
send first downlink control information (DCI) triggering transmission of a first uplink control information (UCI); and
receive the first UCI in a first time domain resource on a physical uplink control channel (PUCCH), wherein, when the first time domain resource partially or completely overlaps a time domain resource of a physical uplink shared channel (PUSCH) and when a payload size of the first DCI is equal to a first value configured by radio resource control (RRC) signaling and a value of a DCI format identification field in the first DCI is equal to a second value configured by the RRC signaling, the first time domain resource comprises a first symbol that carries the first UCI but does not carry the PUSCH, the first symbol being a time domain symbol overlapping the time domain resource of PUSCH.

8. The apparatus according to claim 7, wherein the first UCI comprises a hybrid automatic repeat request (HARQ) acknowledgment/negative acknowledgment (ACK/NACK) corresponding to a downlink data packet on a physical downlink shared channel (PDSCH).

9. The apparatus according to claim 7, wherein the instructions, when executed by the one or more processors, cause the apparatus further to:
stop receiving a remaining part of the PUSCH whose time domain position is after the first symbol.

10. A communication system, comprising a network device and a terminal device, wherein:
the network device is configured to:
send first downlink control information (DCI) triggering transmission of a first uplink control information (UCI); and
receive the first UCI in a first time domain resource on a physical uplink control channel (PUCCH), wherein, when the first time domain resource partially or completely overlaps a time domain resource of a physical uplink shared channel (PUSCH) and when a payload size of the first DCI is equal to a first value configured by radio resource control (RRC) signaling and a value of a DCI format identification field in the first DCI is equal to a second value configured by the RRC signaling, the first time domain resource comprises a first symbol that carries the first UCI but does not carry the PUSCH, the first symbol being a time domain symbol overlapping the time domain resource of PUSCH; and
the terminal device is configured to:
receive the first DCI; and
send the first UCI in the first time domain resource on the PUCCH.

11. The system according to claim 10, wherein the first UCI comprises a hybrid automatic repeat request (HARQ) acknowledgment/negative acknowledgment (ACK/NACK) corresponding to a downlink data packet on a physical downlink shared channel (PDSCH).

12. The system according to claim 10, wherein the terminal device is further configured to:
stop sending a remaining part of the PUSCH whose time domain position is after the first symbol.

13. The system according to claim 10, wherein the network device is further configured to:
stop receiving a remaining part of the PUSCH whose time domain position is after the first symbol.

* * * * *